(12) United States Patent
Hoshizaki

(10) Patent No.: US 7,868,821 B2
(45) Date of Patent: Jan. 11, 2011

(54) METHOD AND APPARATUS TO ESTIMATE VEHICLE POSITION AND RECOGNIZED LANDMARK POSITIONS USING GPS AND CAMERA

(75) Inventor: Takayuki Hoshizaki, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 190 days.

(21) Appl. No.: 12/321,034

(22) Filed: Jan. 15, 2009

(65) Prior Publication Data

US 2010/0176987 A1 Jul. 15, 2010

(51) Int. Cl.
G01S 19/05 (2010.01)
G01S 19/31 (2010.01)

(52) U.S. Cl. .............................. 342/357.42; 342/357.71

(58) Field of Classification Search ............ 342/357.42, 342/357.71

See application file for complete search history.

(56) References Cited

U.S. PATENT DOCUMENTS

| | | | | |
|---|---|---|---|---|
| 5,581,629 | A * | 12/1996 | Hanna et al. | 382/103 |
| 2002/0130953 | A1* | 9/2002 | Riconda et al. | 348/115 |
| 2005/0050209 | A1* | 3/2005 | Main | 709/229 |
| 2007/0137514 | A1* | 6/2007 | Kumar et al. | 105/26.05 |
| 2008/0027985 | A1* | 1/2008 | Kasperkiewicz et al. | 707/104.1 |
| 2008/0319817 | A1* | 12/2008 | Simon | 705/7 |

FOREIGN PATENT DOCUMENTS

| | | |
|---|---|---|
| JP | 2000-97714 | 4/2000 |
| JP | 2005-265494 | 9/2005 |
| JP | 2008-26007 | 2/2008 |
| WO | WO-2005/038402 | 4/2005 |

* cited by examiner

*Primary Examiner*—Thomas H Tarcza
*Assistant Examiner*—Harry Liu
(74) *Attorney, Agent, or Firm*—Muramatsu & Associates

(57) ABSTRACT

A navigation system with a capability of estimating positions of the platform vehicle and recognized landmarks using satellite information and camera measurements is disclosed. One aspect is to represent a landmark by one or few representative features by executing image recognition and feature extraction to find representative features inside the recognized landmark. Another aspect is to re-identify the recognized landmarks in the landmark database correlating the landmark attributes obtained by image recognition and mathematical feature characteristics obtained by feature extraction with the corresponding data in the landmark database. A further aspect is to enhance navigation accuracy through the Kalman filter architecture with additional imagery measurements of landmarks whose positions are known or previously estimated. According to the aspects noted above: (1) navigation accuracy improves with augmented imagery measurements; (2) a database of recognizable landmark attributes and associated feature characteristics can be created in real-time; (3) by re-visiting the same landmarks, navigation accuracy improves and the landmark database will be re-calibrated and augmented with new landmark data.

20 Claims, 14 Drawing Sheets

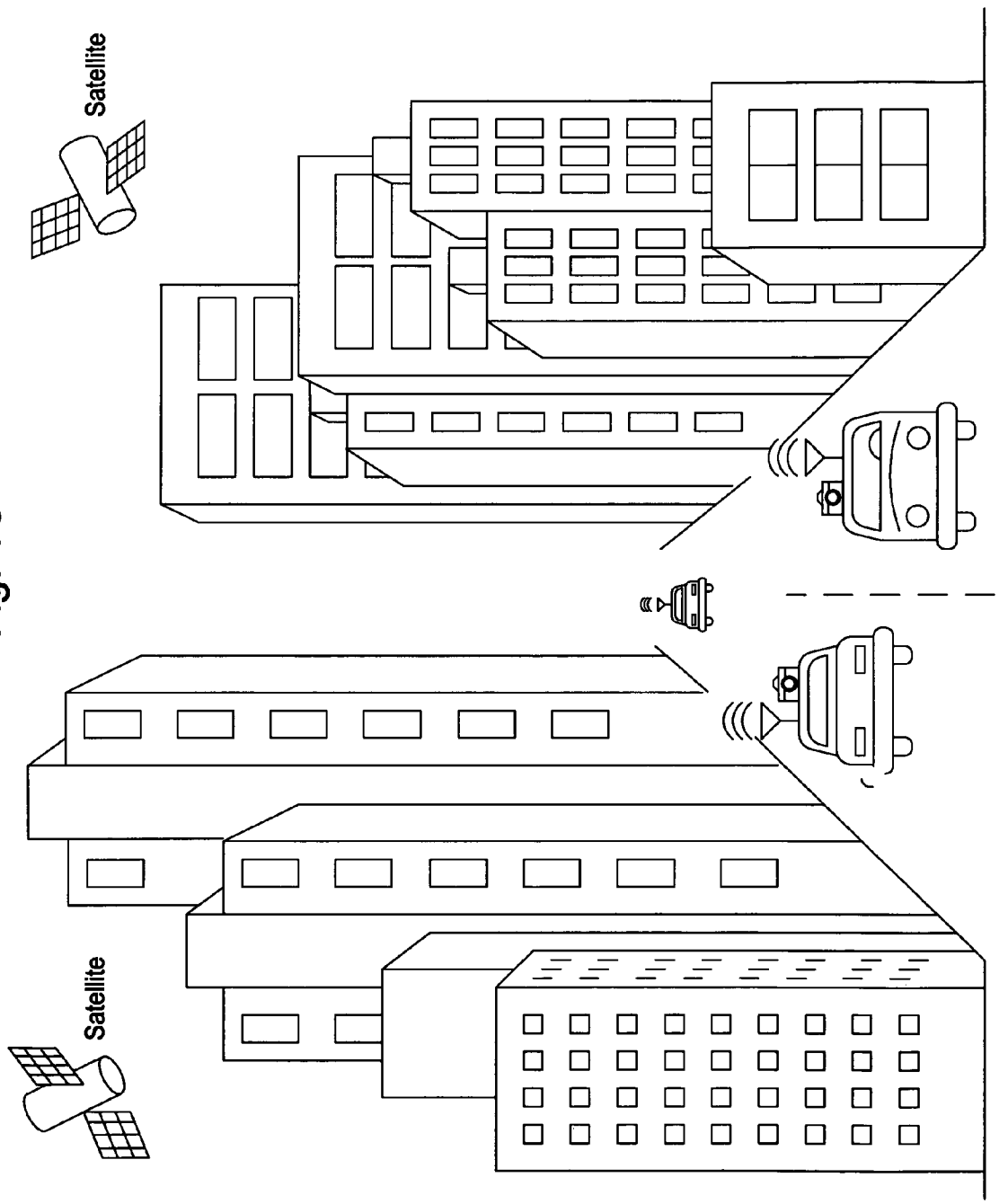

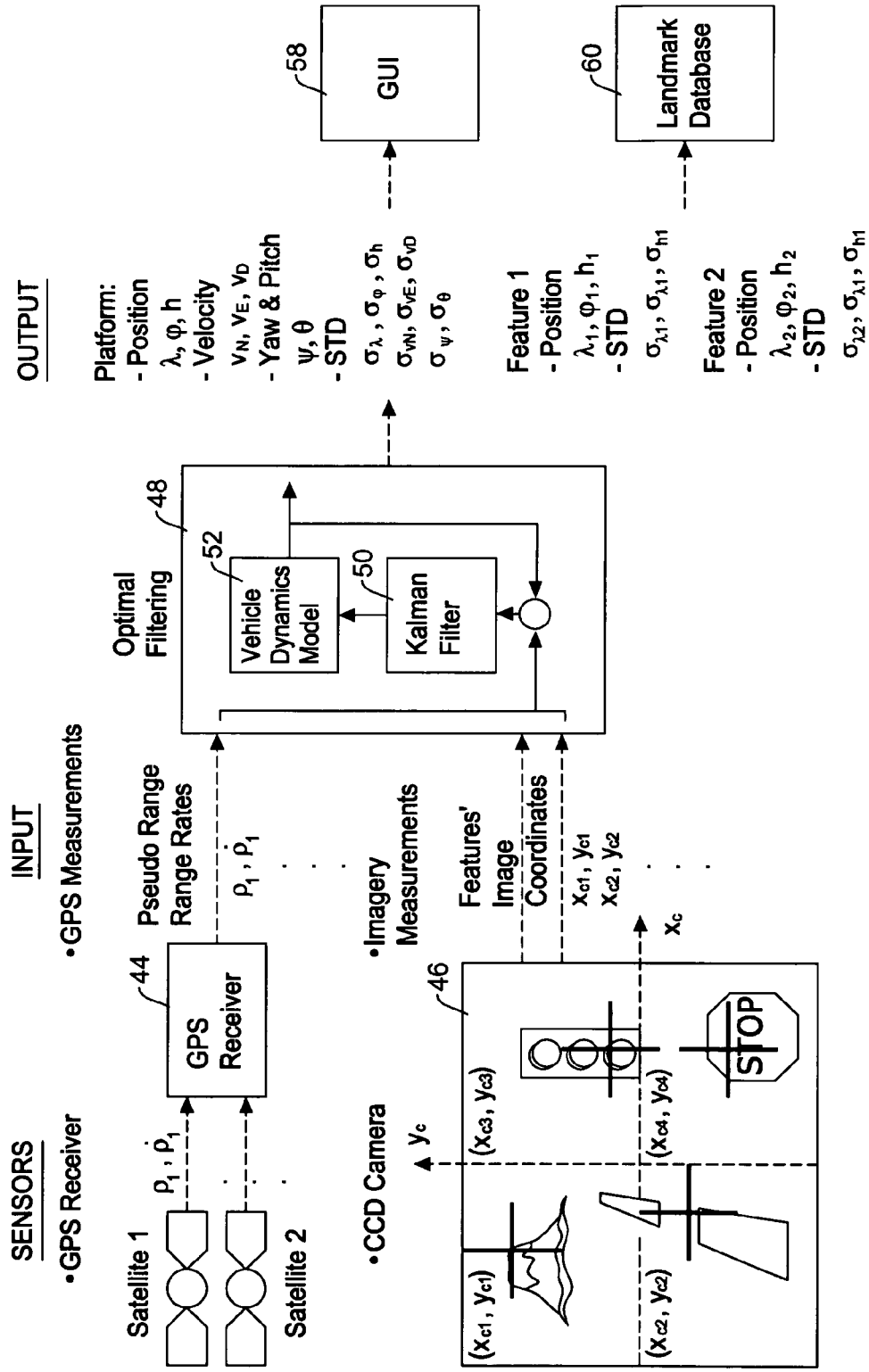

METHOD AND APPARATUS TO ESTIMATE VEHICLE POSITION AND RECOGNIZED LANDMARK POSITIONS USING GPS AND CAMERA

FIELD OF THE INVENTION

This invention relates to a method and apparatus involving a vehicle navigation system, and more particularly, to a navigation method and system to simultaneously estimate the platform vehicle position and recognized landmark positions using a GPS receiver and a camera to enhance navigation accuracy as well as to create a reusable database regarding recognizable landmarks in real-time.

BACKGROUND OF THE INVENTION

So called image recognition technologies have been developed for various applications including traffic safety, aerospace positioning, etc. Some of such technologies are briefly described in the following:

Feature Extraction and Image Recognition

One of major methods to handle imagery data is a feature based method in which specific subsets representing particular characteristics are sought in an image and tracked over multiple images. Feature extraction will look for mathematical characteristics representing a distinguishable special feature, e.g., an edge or a corner, while image recognition will look for an object, e.g., a traffic sign, by correlating a subset with a prepared object template.

Feature Extraction And Positioning in Aerospace Application

Feature extraction approach is commonly employed in aerospace application in the way of integrating miscellaneous feature positioning and navigation for navigation accuracy enhancement. This technical area has been actively studied since first application took place in lunar landing mission of the Apollo project in 1968 to the recent application in aerial reconnaissance. The most noticeable development in modern history common in numerous aerospace applications is deemed SLAM, or Simultaneous Localization And Mapping, originally developed in 1986 for robotics. The original concept of SLAM was aimed at dead reckoning with the following functions: (1) extraction of miscellaneous imagery features; (2) estimation of extracted feature positions; (3) estimation of camera position and orientation; and (4) registration of miscellaneous feature positions in the database for the re-calibration purpose upon next arrival.

Image Recognition in Automotive Application

Meanwhile, automotive application of visual cues has been developed primarily in image recognition to detect particular objects beneficial to drivers, such as, highway lanes, traffic signs, and pedestrians. This is mainly because visual cues have been more appreciated for human interface rather than navigation accuracy enhancement in automotive application.

Feature Positioning in DARPA GRAND CHALLENGE

Automotive application of integrated feature positioning and navigation systems has called rapid public interests upon recent DARPA Grand Challenge. In this open public race, autonomously guided uninhabited vehicles (i.e., robots) use SLAM technology just like aerospace application to dodge obstacles and make the right paths with measurements from Light Detection and Ranging (LIDAR) sensors, radars, cameras, inertial sensors, and GPS receivers. In this scenario, unlike conventional automotive application, visual cues are used mainly for navigation aid but not for image recognition disregarding human interface because of "uninhabited" and "precision" nature of the mission.

Image Recognition and Feature Positioning in Future

Learning from this very-high-end application, automotive industry is now seeking for low-cost solutions to use visual cues not only for image recognition but also for feature extraction and possibly positioning to achieve extended performance in navigation and drive assist, such as, lane guidance, safety-level navigation accuracy, driver's motion intent inference, etc.

Therefore, there is a need of a new architecture to use visual cues not only for object recognition but also for feature extraction and positioning in automotive application with low-cost sensor configurations for navigation accuracy enhancement and extended drive assist applications.

SUMMARY OF THE INVENTION

It is, therefore, an object of the present invention to provide a method and apparatus to simultaneously estimate vehicle position and recognized landmark positions using a GPS receiver and a charge-coupled device (CCD) camera. In other words, usage of visual cues in this invention comprises image recognition, feature extraction to find features in the recognized object, and feature positioning to be integrated with navigation.

It is another object of the present invention to provide an integrated imagery/navigation system which is able to simultaneously estimate vehicle position and recognized landmark positions using a GPS receiver and a charge-coupled device (CCD) camera thereby improving the positioning accuracy One aspect of the present invention is to represent a landmark by one or few representative features by executing image recognition and feature extraction to find representative features inside the recognized landmark.

Another aspect of the present invention is to re-identify the recognized landmarks in the landmark database correlating the landmark attributes (position, type, color, facing streets, etc.) obtained by image recognition and mathematical feature characteristics (e.g., edge curvature gradient) obtained by feature extraction with the corresponding data in the landmark database.

Another aspect of the present invention is to enhance navigation accuracy through the Kalman filter architecture with additional imagery measurements of landmarks whose positions are known or previously estimated.

Another aspect of the present invention is to estimate positions of unknown landmarks through the Kalman filter architecture by their imagery measurements while other landmarks with known or previously estimated positions are available in the same image.

Another aspect of the present invention is to enhance navigation accuracy by using multiple frequencies in the system: a high frequency to update estimates in dead reckoning; a middle frequency to correct estimates based upon imagery measurements; a low frequency to correct estimates based upon GPS measurements.

Another aspect of the present invention is to register recognized landmark attributes including position, type, facing streets, dimensions, colors, and the mathematical feature characteristics including edge curvature gradient of the associated features inside the recognized landmark to create landmark database in real-time.

Another aspect of the present invention is to re-calibrate the landmark database by starting the landmark position estimation with the lastly estimated position registered in the database as the initial condition as well as changing the choice of the known landmarks to be used by navigation accuracy enhancement.

According to the present invention, the following effects are achieved: (1) navigation accuracy improves with augmented imagery measurements; (2) a database of recognizable landmark attributes and associated feature characteristics can be created in real-time; (3) by re-visiting the same landmarks, navigation accuracy improves and the landmark database will be re-calibrated and augmented with new landmark data.

BRIEF DESCRIPTION OF THE DRAWINGS

FIG. 1A depicts a conventional differential GPS receiver, and FIG. 1B depicts an integrated imagery/navigation system of the present invention, and FIG. 1C is a schematic diagram showing an example of situation where the present invention can be advantageously applicable.

FIGS. 2A and 2B are schematic diagrams showing an input-output relationship of an integrated imagery/navigation system of the present invention, where FIG. 2A is directed to the integrated imagery/navigation system with tightly coupled system architecture, and FIG. 2B is directed to the integrated imagery/navigation system with loosely coupled system architecture.

DETAILED DESCRIPTION OF THE PREFERRED EMBODIMENT

The present invention will be described in detail with reference to the accompanying drawings. The navigation method and system is designed to simultaneously estimate the platform vehicle position and recognized landmark positions using a GPS receiver and a camera to enhance navigation accuracy as well as to create a reusable database regarding the recognizable landmarks in real-time.

System Architecture

Figure 1A:
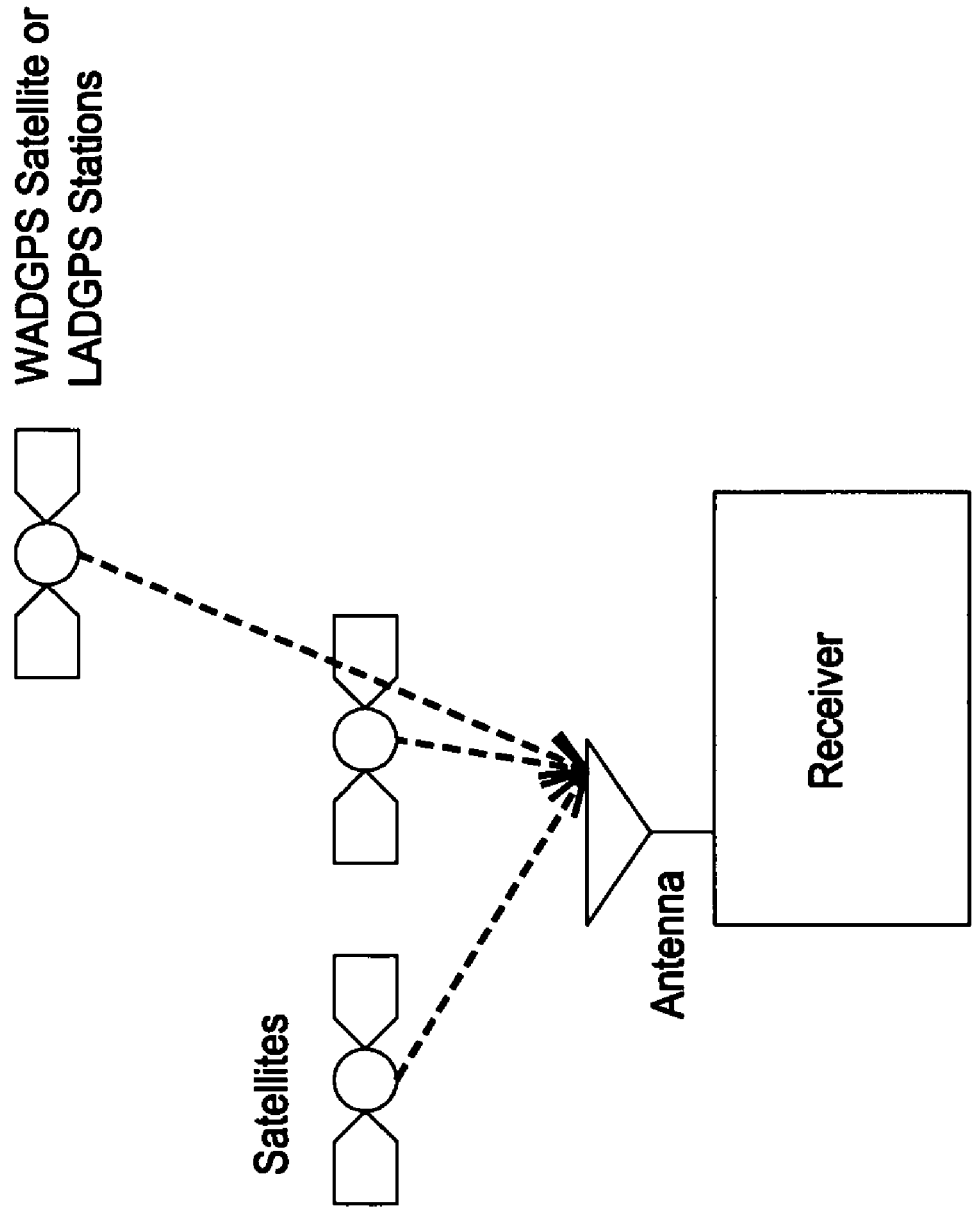
FIGS. 1A and 1B are schematic diagrams showing a basic structure of the system involved where
Figure 1B:
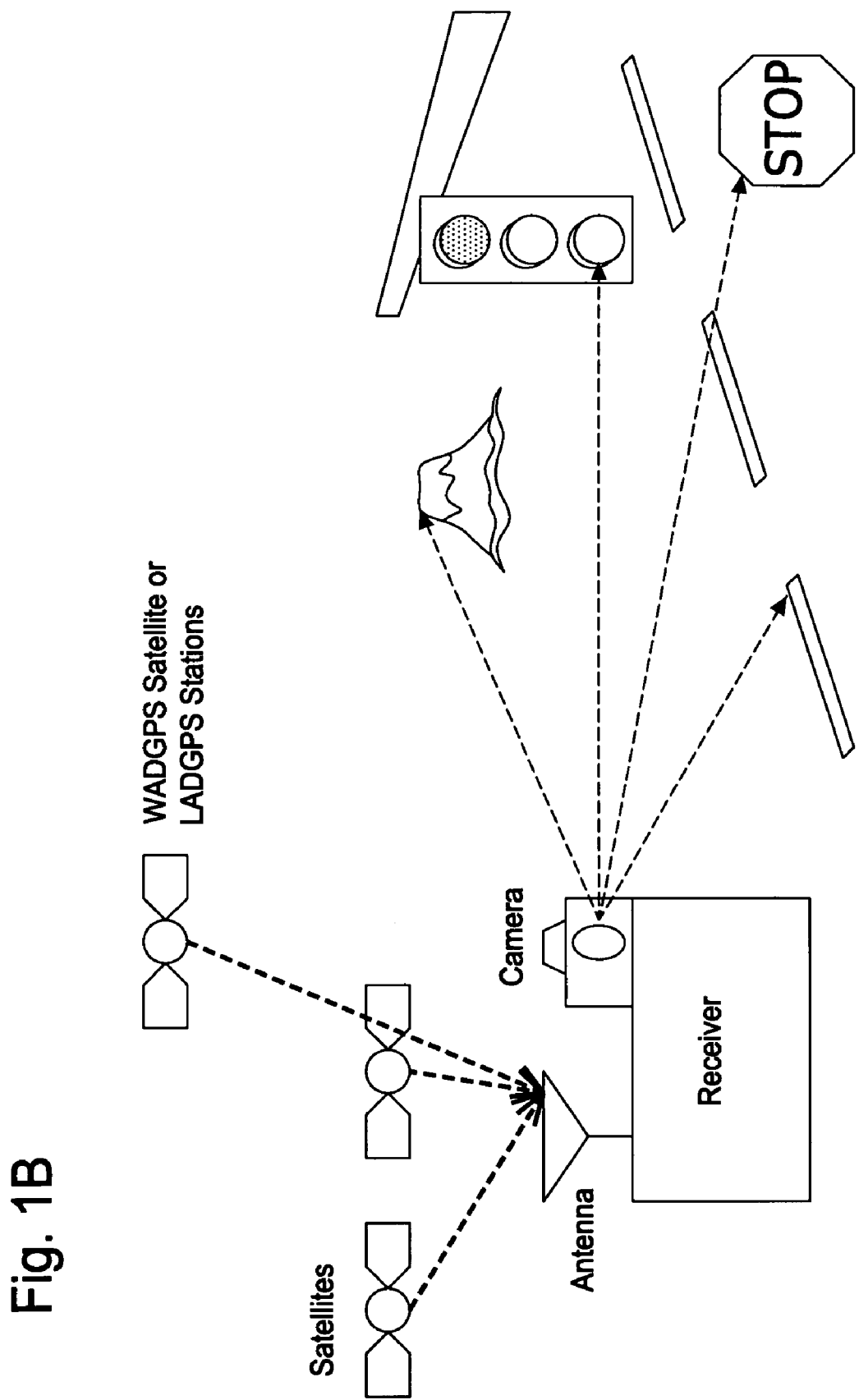

FIG. 1A is a schematic diagram of conventional GPS which may or may not receive differential signals from Wide Area Differential GPS Augmentation System (WADGPS) satellites or Local Area Differential GPS (LADGPS) stations. FIG. 1B is a schematic diagram of the integrated imagery/ navigation system of this invention recognizing known and unknown landmarks including lanes, traffic signals, traffic signs, commercial signs, buildings, mountains, and so on. Basically, the integrated imagery/navigation system of the present invention is a combination of a GPS navigation system and a video camera (image pickup device) integrated by a Kalman filter.

Accordingly, as shown in a schematic diagram of FIG. 1C, even when GPS signals are insufficient or unavailable because of high-rise buildings, inside tunnel, etc., reasonably accurate positioning can be achieved by using the positioning aiding data which are obtained from such landmarks. In the example of FIG. 1C, such an integrated imagery/navigation system is implemented in the form of a vehicle navigation system and a camera (image sensor, image pickup device). Other example of electronic devices that include a navigation function therein may be a lap-top computer, palm computer, digital watch, cellular phone, etc.

Figure 2B:
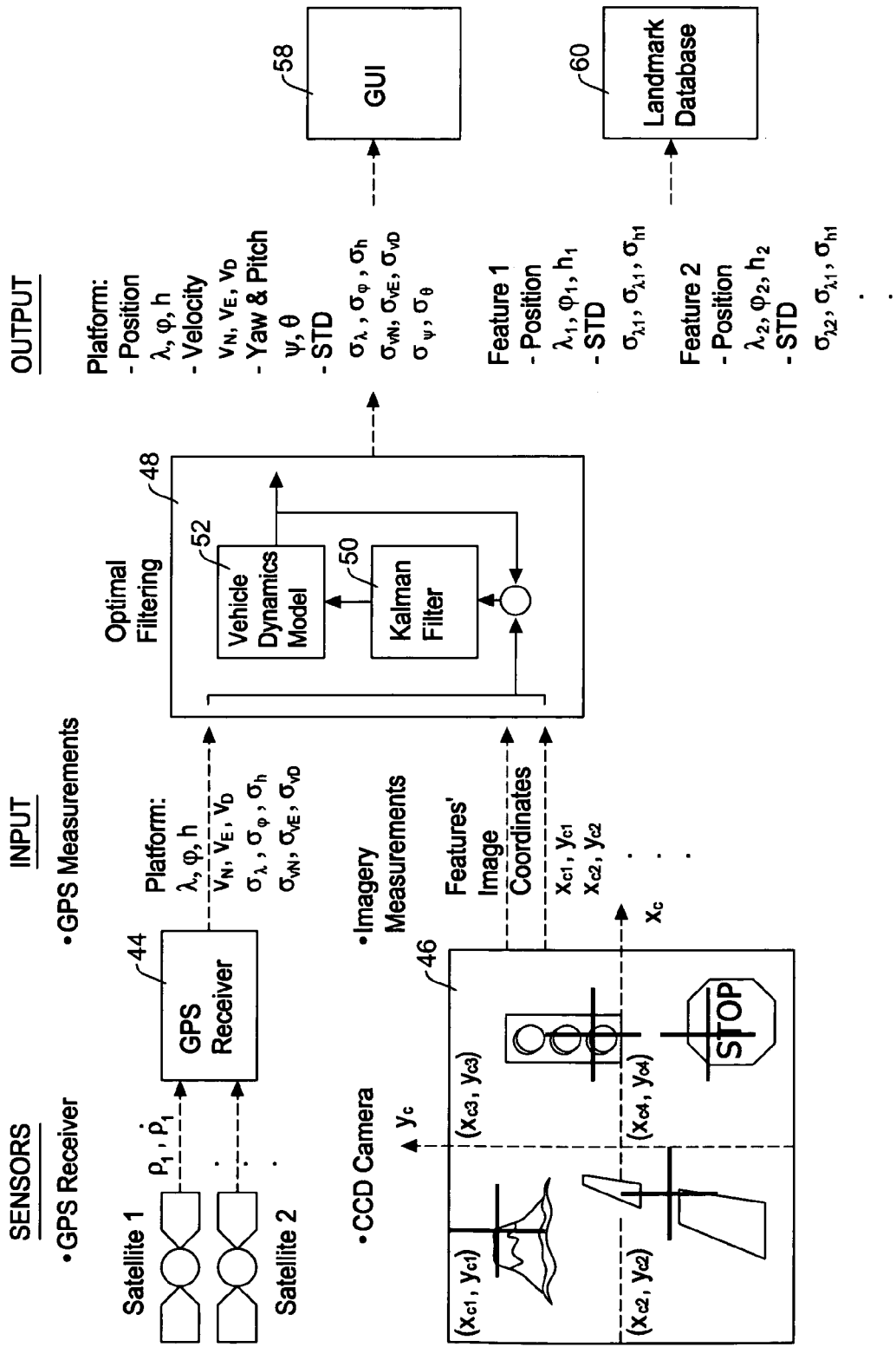

FIGS. 2A and 2B show an overall structure and input-output relationships of the integrated imagery/navigation systems of the present invention. A GPS receiver 44 and a CCD camera 46 are mounted on the same platform such as a vehicle, the outputs from the GPS receiver 44 and the CCD camera 46 are integrated by a Kalman filter 50 in an optimal filtering unit 48. The GPS receiver 44 receives the GPS signals from a plurality of satellites and processes the GPS signals for global positioning (GPS measurements). The CCD camera 46 retrieves an image of a landmark surrounding the platform for detecting attributes, features, coordinates, etc., of the landmark image (imagery measurement). The optimal filtering unit 48 processes the data from the GPS receiver 44 and the CCD camera 46, the results of which are processed and further displayed by a GUI (graphical user interface) 58. The attributes, features, etc., of the landmarks will be stored in a landmark database 60.

The integrated imagery/navigation system of FIG. 2A is a "tightly coupled system" which uses raw satellite signals including $\rho$ (pseudoranges) and $\dot{\rho}$ (pseudorange rates) as the GPS measurements in addition to the imagery measurements. For designers who have direct access to the raw satellite signals, such as GPS receiver vendors, may prefer the tightly coupled system solution. The integrated imagery/navigation system of FIG. 2B is a "loosely coupled system" which uses a conventional GPS receiver as the interface to satellite signals to obtain the first platform positioning solution of longitude (λ), latitude (φ), altitude (h), and their standard deviations (STDs): $\sigma_\lambda$, $\sigma_\phi$, $\sigma_h$, and ah, which are typically available in an NMEA format in addition to the imagery measurements. Designers who do not have direct access to the raw satellite signals, such as automotive navigation system vendors or portable navigation system vendors, may prefer the loosely coupled system solution.

In either the tightly coupled system or loosely coupled system, the optimal filtering unit 48 basically comprises a Kalman filter 50 and a vehicle dynamics model 52. In an actual application, the Kalman filter 50, the vehicle dynamics model 52, and the GUI (graphic user interface) 58 will be implemented by a computer such as a microprocessor and a monitor. The computer also executes an image recognition process on the image data retrieved through the camera thereby extracting attributes and feature characteristics of the landmarks. The Kalman filter 50 processes the GPS measurements from the GPS receiver 44 and the imagery measurements from the CCD camera 46. The outputs of the Kalman filter 50 are processed by the vehicle dynamics model 52 to produce the position data which will be sent to the GUI 58. Thus, the GUI 58 displays the current position of the user (vehicle).

In FIGS. 2A an 2B, the output of the optimal filtering unit 48 in either system includes (1) the refined platform state estimates: position (λ, φ, h), velocity regarding North-East-Down coordinate system ($V_N$, $V_E$, $V_D$), orientation in terms of yaw and pitch (ψ, θ), and their Standard Deviations (STDs) indicating uncertainty sizes ($\sigma_\lambda$, $\sigma_\phi$, $\sigma_h$, $\sigma_{vN}$, $\sigma_{vE}$, $\sigma_{vD}$, $\sigma_\psi$, $\sigma_\theta$); (2) ground (landmark) feature position estimates ($\lambda_n$, $\phi_n$, $h_n$) and their STDs ($\sigma_{\lambda n}$, $\sigma_{\lambda n}$, $\sigma_{hn}$) where "n" represents the n-th ground feature. It should be noted that the present invention is applicable to both of tightly and loosely coupled systems. The outputs (2) regarding the landmarks are stored in the landmark database 60 for creating and updating the landmark data (attributes, features, etc.) therein.

Figure 3:
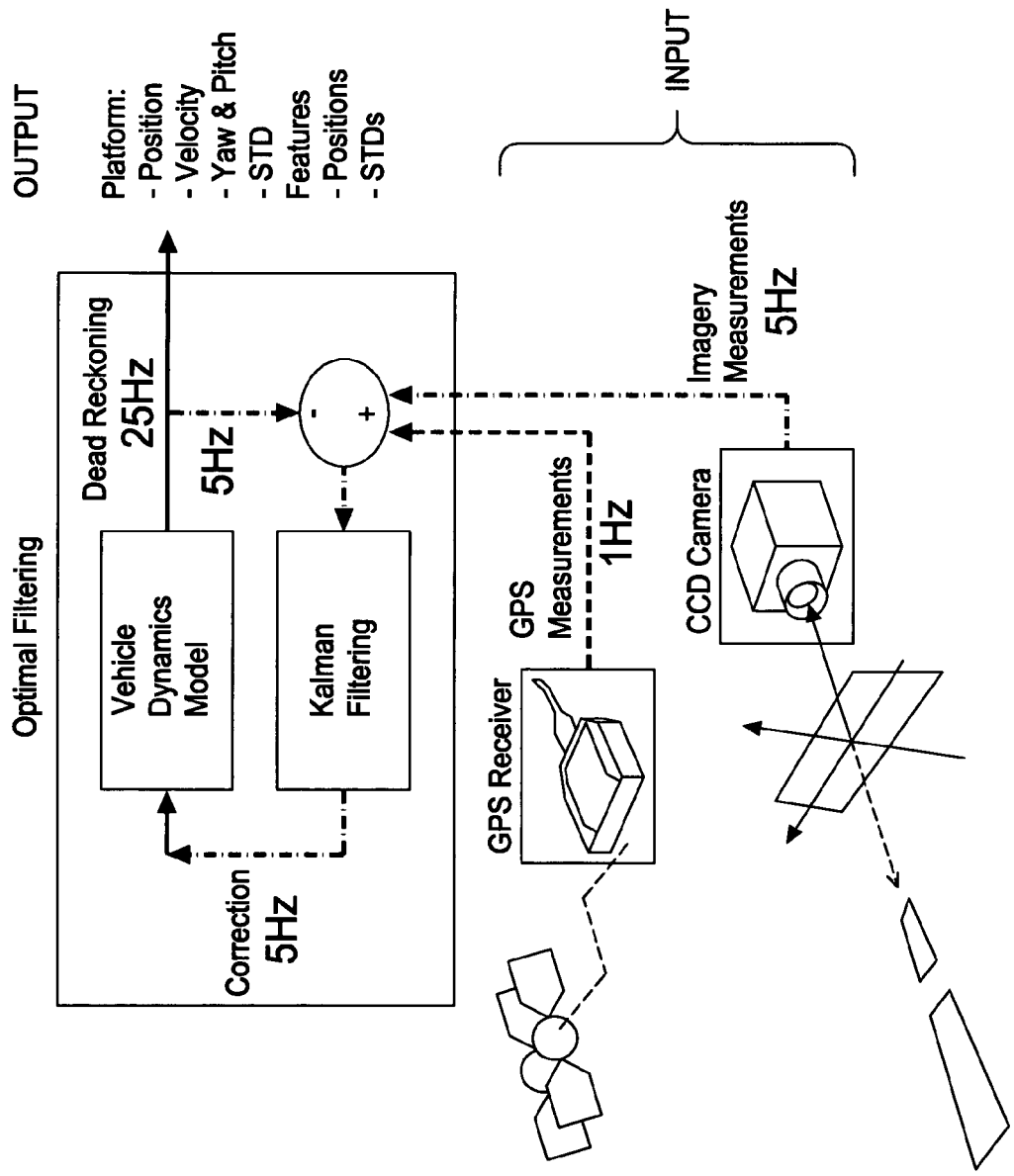
FIG. 3 is a schematic diagram depicting a layout of an integrated imagery/navigation system of the present invention including different processing frequencies that will be preferable in an actual implementation.

FIG. 3 shows a schematic layout of the integrated imagery/navigation system using a GPS receiver and a camera. Use of multiple frequency processes is emphasized in FIG. 3 to improve estimation accuracy: (1) high frequency, e.g., 25 Hz, to update navigation and photogrammetric estimates in dead reckoning (GPS signals are unavailable); (2) middle frequency, e.g., 5 Hz, to correct navigation and photogrammetric estimates using the imagery measurements according to the Kalman filtering procedure; and (3) low frequency, e.g., 1 Hz, to correct navigation and photogrammetric estimates using the GPS measurements according to the Kalman filtering procedure.

Tool 1: Coordinate Systems

Figure 4A:
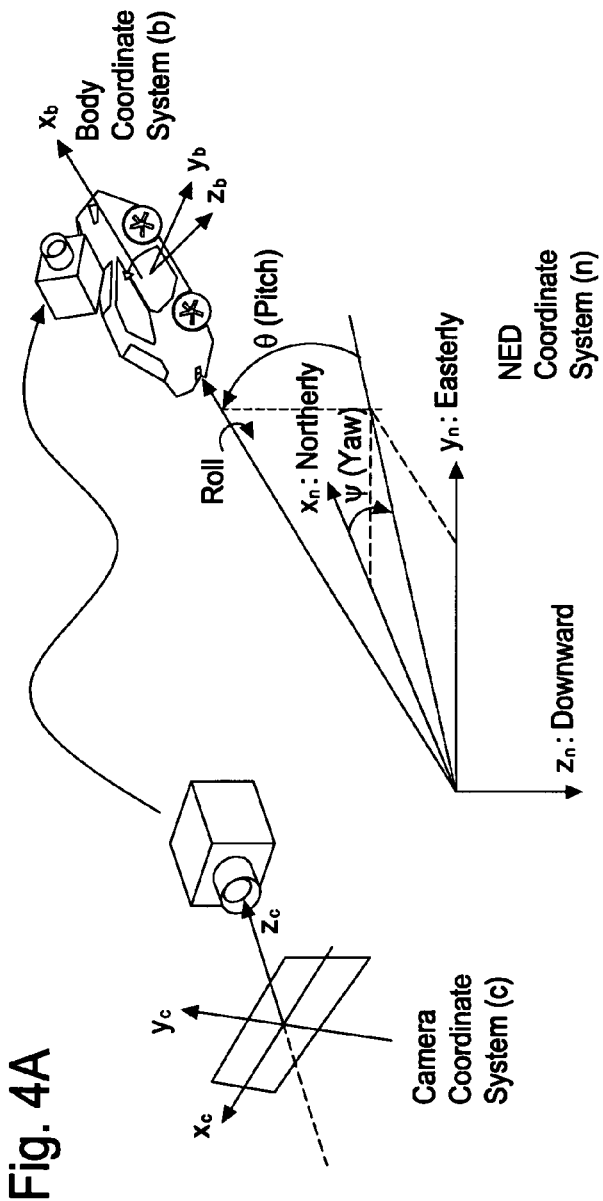
FIGS. 4A and 4B are schematic diagrams showing the important three coordinate systems associated with the present invention, where FIG. 4A explains the vehicle body coordinate system and the camera coordinate system, and FIG. 4B explains the simply assumed relationship between the body and camera coordinate systems.

In preparation for detailing the method of this invention, reference is made with respect to several important mathematical tools. The first tools are the three Cartesian coordinates shown in FIG. 4A:

North-East-Down (NED) Coordinate System: denoted by the subscript "n"

Body Coordinate System: denoted by the subscript "b"

Camera Coordinate System: denoted by the subscript "c"

Figure 4B:
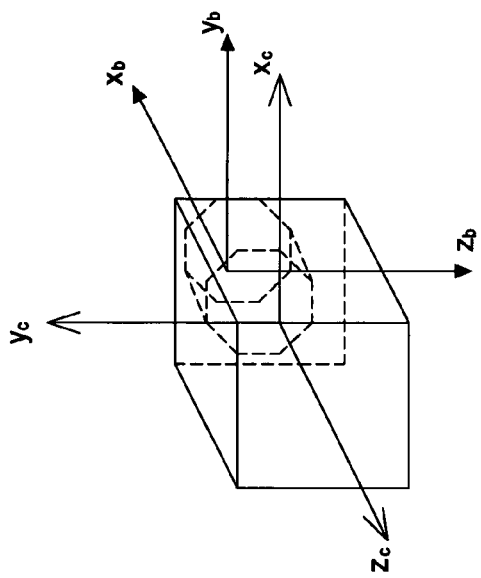

Yaw (ψ), pitch (θ), and roll angles of the body coordinate system relative to the NED coordinate system are defined according to the Euler angle definition. In the present invention, however, the body roll angle is assumed to be zero for simplification of illustration. FIG. 4B depicts the simplified assumption of the relationship between the camera and body coordinate systems.

Tool 2: Transformation Matrices

The second tools are transformation matrices to convert a vector representation from one coordinate system to another. Because of the introduced relationships between the coordinate systems defined by angles, the following transformation matrices can be defined:

$$T_{nb} = \begin{bmatrix} \cos\theta\cos\psi & -\sin\psi & \sin\theta\cos\psi \\ \cos\theta\sin\psi & \cos\psi & \sin\theta\sin\psi \\ -\sin\theta & 0 & \cos\theta \end{bmatrix}:$$

Transformation matrix from "b" to "n"

$$T_{bn} = (T_{nb})^T = \begin{bmatrix} \cos\theta\cos\psi & \cos\theta\sin\psi & -\sin\theta \\ -\sin\psi & \cos\psi & 0 \\ \sin\theta\cos\psi & \sin\theta\sin\psi & \cos\theta \end{bmatrix}:$$

Transformation matrix from "n" to "b"

(The "T" in the superscript denotes transpose of the matrix: flip rows and columns)

Figure 5:
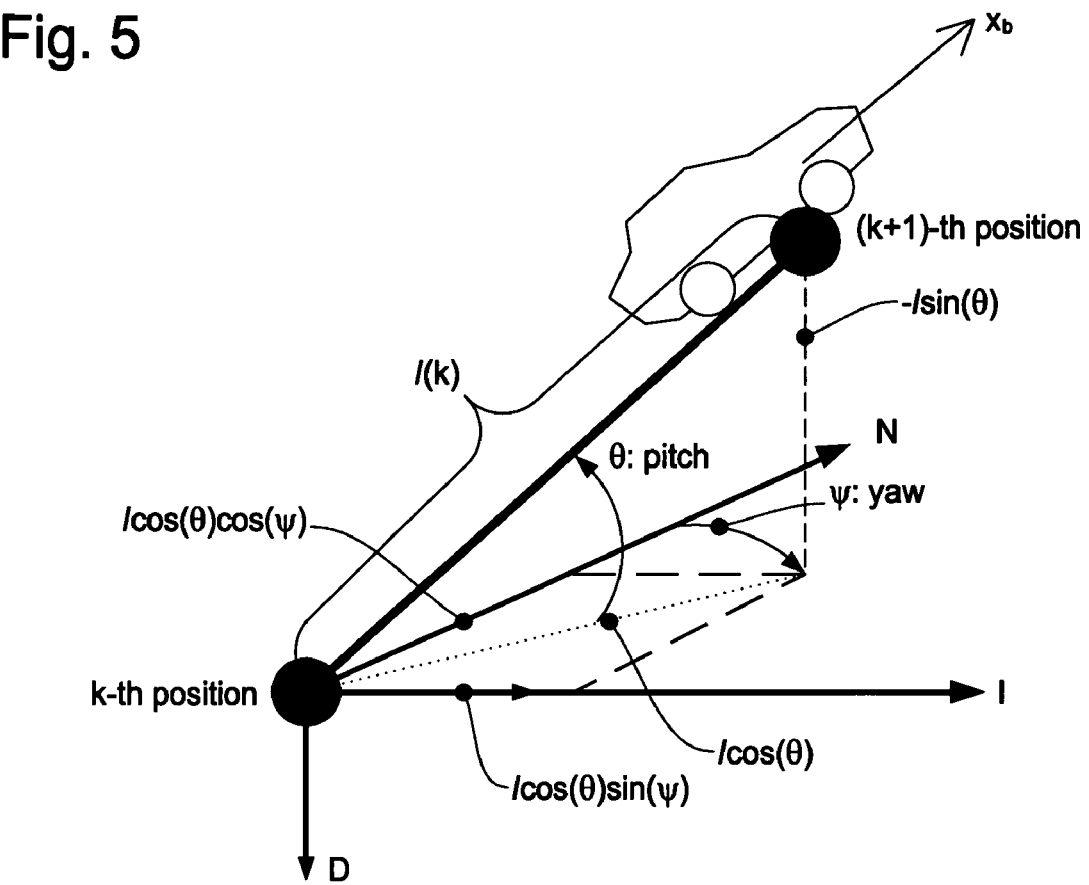
FIG. 5 explains the projection of the travel path, l(k), onto the North-East-Down (NED) coordinates using pitch and yaw angles.

If a vehicle travels the distance "l" along the body—x axis maintaining the same orientation, the equivalent NED travel distances will be computed by:

$$l_n = T_{nb} * l_b$$

or, $$l \begin{bmatrix} \cos\theta\cos\psi \\ \cos\theta\sin\psi \\ -\sin\theta \end{bmatrix} = \begin{bmatrix} \cos\theta\cos\psi & -\sin\psi & \sin\theta\cos\psi \\ \cos\theta\sin\psi & \cos\psi & \sin\theta\sin\psi \\ -\sin\theta & 0 & \cos\theta \end{bmatrix} \begin{bmatrix} l \\ 0 \\ 0 \end{bmatrix}$$

which is described in FIG. 5. Similarly, we have $$T_{cb} = \begin{bmatrix} 0 & 1 & 0 \\ 0 & 0 & -1 \\ -1 & 0 & 0 \end{bmatrix}: \text{Transformation matrix from "b" to "c"}$$

$$T_{bc} = (T_{cb})^T = \begin{bmatrix} 0 & 0 & -1 \\ 1 & 0 & 0 \\ 0 & -1 & 0 \end{bmatrix}: \text{Transformation matrix from "c" to "b"}$$

The advantage of the transformation matrix is the ability to yield another transformation matrix to describe successive transformations by multiplying successive transformation matrices:

$$T_{cn} = T_{cb}T_{bn} = \begin{bmatrix} -\sin\psi & \cos\psi & 0 \\ -\sin\theta\cos\psi & -\sin\theta\sin\psi & -\cos\theta \\ -\cos\theta\cos\psi & -\cos\theta\sin\psi & \sin\theta \end{bmatrix}$$

Tool 3: Conventional Kalman Filtering Architecture

The third tool is the conventional Kalman filtering architecture as the base for both of navigation and photogrammetry:

1. Set up nonlinear dynamics and measurement model:

$$x_{k+1} = f(x_k, u_k) \quad \text{State Equation}$$
$$z_k = h_k(x_k) + v_k \quad \text{Measurement Equation}$$

where x: State Vector containing parameters we want to estimate, e.g., platform positions $x_k := x(t_k)$: x at the k-th discretely-counted time u: control input often available by dead reckoning sensors, such as accelerometers $f(x_k, u_k)$: non-linear dynamics equation vector governing the motion of x z: measurement vector, such as satellite pseudo ranges and feature camera coordinates h: non-linear measurement equation vector to describe measurements in terms of x v: measurement error vector represented by white noise 2. Prepare linearized small perturbation equations:

$$\delta x_{k+1} = \Phi(\hat{x}_k)\delta x_k + \Gamma_k w_k \quad \text{State Small Perturbation Equation}$$
$$\delta z_k = H(\hat{x}_k)\delta x_k + v_k \quad \text{Measurement Small Perturbation Equation}$$

where ^ (hat) means that this is an estimated value, e.g., "$\hat{x}$" is an estimate of x $\delta x = x - \hat{x}$: small perturbation state vector (error vector)

$\Gamma x$: matrix to relate $\delta x$ and noise w w: input noise vector represented by white noise contained in the dynamics model $\Phi(\hat{x}_k)$: transient matrix, or, partial derivative of f in terms of $\hat{x}$ $H(\hat{x}_k)$: measurement matrix, or, partial derivative of h in terms of $\hat{x}$ 3. Propagate nonlinear state equations and the covariance:

$$\hat{x}_{k+1}^- = f(\hat{x}_k^-, u_k) \quad \text{State Propagation}$$
$$P_{k+1}^- = \Phi_k P_k^- \Phi_k^T + \Gamma_k Q_k \Gamma_k^T \quad \text{Covariance Propagation}$$

where P: covariance of $\hat{x}$ representing the uncertainty size of $\hat{x}$

Q: covariance of w representing the uncertainty size of w

4. Perform Local Iteration: iterate for i=1 through n until convergence $$K_{k,i} = P_k^- H_k^T(\hat{x}_{k,i}^+)(H_k(\hat{x}_{k,i}^+)P_k^- H_k^T(\hat{x}_{k,i}^+) + R_k)^{-1} \quad \text{Kalman Gain}$$
$$\hat{x}_{k,i+1} = \hat{x}_k - K_{k,i}[z_k - h_k(\hat{x}_{k,i}^+) - H_k(\hat{x}_{k,i}^+)(\hat{x}_k^- - \hat{x}_{k,i}^+)] \quad \text{State Correction}$$
$$P_{k,i+1}^+ = (I - K_{k,i}H_k(\hat{x}_{k,i}^+))P_k^- \quad \text{Covariance Correction}$$

where R: covariance of v representing the uncertainty size of v

5. Sequentially repeat the steps 3 and 4 (end)

Tool 4: Frame Camera Geometry

Figure 6:
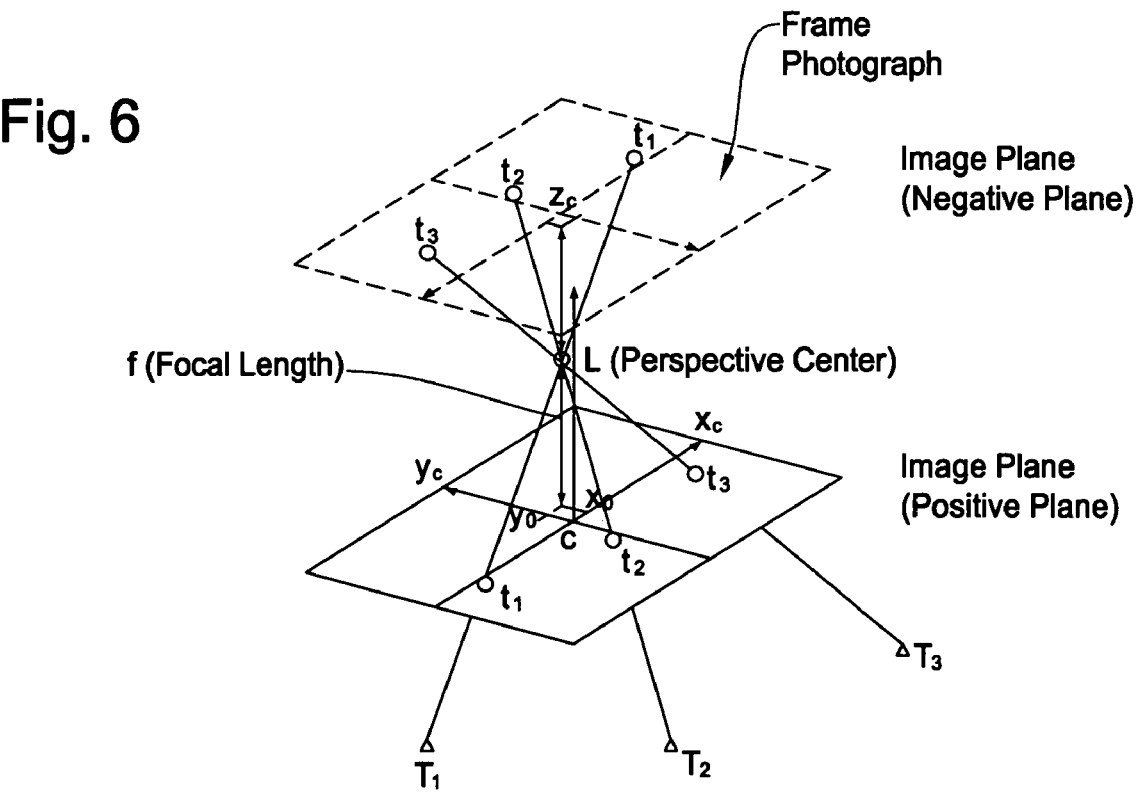
FIG. 6 shows imaging geometry for a frame camera including a negative plane and a positive plane relative to a perspective center.

The fourth tool for the present invention is the concept of frame camera geometry to model imagery. FIG. 6 shows the imaging geometry for a frame camera with the camera lens represented by a single point called the perspective center denoted "L". The focal length is the distance along the optical axis from the perspective center to the image plane denoted "f". The image feature point "t", which is any of $t_1$ through $t_3$ in FIG. 6, reflects the imaged position of the landmark "T" (Target), which is one of $T_1$ through $T_3$ corresponding to the chosen "t". It is assumed that the image coordinates of "t" are $(x_c, y_c, 0)$. The perspective center "L" is located at $(x_0, y_0, f)$ with the offset of $x_0$ and $y_0$ with respect to the origin "C". With simplified assumptions of $x_0=0$ and $y_0=0$, the position vector of "L" will be (0, 0, f), then, the vector from "L" to "t" is given by $(x_c, y_c, 0) - (0, 0, f)$, or $$p_c^{Lt} = \begin{bmatrix} x_c \\ y_c \\ -f \end{bmatrix}$$

where bold "p" denotes a position vector superscript "Lt" denotes the starting point and ending point subscript "c" denotes the camera coordinate system Now, define the LOS (Line of Sight) vector by $p^{LT}$ which is a vector from "L" to "T". Since $p^{LT}$ is an extension of $p^{Lt}$, the following equation holds using a scale factor μ:

$$p_c^{Lt} = \mu p_c^{LT}$$

Letting $$p_c^{LT} = \begin{bmatrix} U \\ V \\ W \end{bmatrix}$$

in the right hand side will result in $$\begin{bmatrix} x_c \\ y_c \\ -f \end{bmatrix} = \mu \begin{bmatrix} U \\ V \\ W \end{bmatrix}$$

Substituting $$\mu = -\frac{f}{W}$$

obtained by the third row into the first and second rows, we obtain the following exact imagery measurement equations so called collinearity equations;

$$x_c = -f\frac{U}{W}$$
$$y_c = -f\frac{V}{W}$$

These are nonlinear equations to describe image feature coordinates.

In the foregoing, U, V, and W are the functions of camera position, orientation, and the landmark position, respectively:

$$\begin{bmatrix} U \\ V \\ W \end{bmatrix} = p_c^{LT} = T_{cn} p_n^{LT}$$

where $$p_n^{LT} = p_n^{OT} - p_n^{OL} = \begin{bmatrix} N_T \\ E_T \\ D_T \end{bmatrix} - \begin{bmatrix} N \\ E \\ D \end{bmatrix}$$

$$p_n^{OT} = \begin{bmatrix} N_T \\ E_T \\ D_T \end{bmatrix} : \text{Landmark } NED \text{ coordinates}$$

$$p_n^{OL} = \begin{bmatrix} N \\ E \\ D \end{bmatrix} : \text{Perspective center } NED \text{ coordinates}$$

Tool 5: Linearized Collinearity Equations

The last tool is the linearized form of the collinearity equations to be used for both of navigation and photogrammetry in the present invention. Since the camera measurements depend on the orientation ($T_{cn}$), landmark position ($N_T$, $E_T$, $D_T$), and platform position (N, E, D) as noted above, $$\delta x_c = \frac{\partial x_c}{\partial x}\bigg|_{\wedge} \delta x$$
$$= \frac{\partial x_c}{\partial \theta}\bigg|_{\wedge} \delta\theta + \frac{\partial x_c}{\partial \psi}\bigg|_{\wedge} \delta\psi +$$
$$\frac{\partial x_c}{\partial N}\bigg|_{\wedge} \delta N + \frac{\partial x_c}{\partial E}\bigg|_{\wedge} \delta E +$$
$$\frac{\partial x_c}{\partial D}\bigg|_{\wedge} \delta D + \frac{\partial x_c}{\partial N_T}\bigg|_{\wedge} \delta N_T +$$
$$\frac{\partial x_c}{\partial E_T}\bigg|_{\wedge} \delta E_T + \frac{\partial x_c}{\partial D_T}\bigg|_{\wedge} \delta D_T$$

$$\delta y_c = \frac{\partial y_c}{\partial x}\bigg|_{\wedge} \delta x$$
$$= \frac{\partial y_c}{\partial \theta}\bigg|_{\wedge} \delta\theta + \frac{\partial y_c}{\partial \psi}\bigg|_{\wedge} \delta\psi +$$
$$\frac{\partial y_c}{\partial N}\bigg|_{\wedge} \delta N + \frac{\partial y_c}{\partial E}\bigg|_{\wedge} \delta E +$$
$$\frac{\partial y_c}{\partial D}\bigg|_{\wedge} \delta D + \frac{\partial y_c}{\partial N_T}\bigg|_{\wedge} \delta N_T +$$
$$\frac{\partial y_c}{\partial E_T}\bigg|_{\wedge} \delta E_T + \frac{\partial y_c}{\partial D_T}\bigg|_{\wedge} \delta D_T$$

Here, since the camera measurements are described in the form of fractions, each partial derivative is obtained by:

$$\frac{\partial x_c}{\partial q}\bigg|_{\wedge} = -\frac{f}{\hat{W}}\left(\left(\frac{\partial U}{\partial q}\right)\bigg|_{\wedge} - \frac{\hat{U}}{\hat{W}}\left(\frac{\partial W}{\partial q}\right)\bigg|_{\wedge}\right)$$

$$\frac{\partial y_c}{\partial q}\bigg|_{\wedge} = -\frac{f}{\hat{W}}\left(\left(\frac{\partial V}{\partial q}\right)\bigg|_{\wedge} - \frac{\hat{V}}{\hat{W}}\left(\frac{\partial W}{\partial q}\right)\bigg|_{\wedge}\right)$$

(Recall that $(h/g)' = (h'g - hg')/g^2 = [h' - (h/g)g']/g$)

where $q \in \{N, E, D, \theta, \psi, N_T, E_T, D_T\}$

To find $$\frac{\partial x_c}{\partial q}\bigg|_{\wedge} \text{ and } \frac{\partial y_c}{\partial q}\bigg|_{\wedge}$$

in the left hand side, we must find $$\left(\frac{\partial U}{\partial q}\right)\bigg|_{\wedge}, \left(\frac{\partial V}{\partial q}\right)\bigg|_{\wedge}, \text{ and } \left(\frac{\partial W}{\partial q}\right)\bigg|_{\wedge}$$

in the right hand side of the equation. Therefore, linearizing $$\begin{bmatrix} U \\ V \\ W \end{bmatrix} = T_{cn} p_n^{LT} = T_{cn}(p_n^{OT} - p_n^{OL})$$

gives $$\begin{bmatrix} \delta U \\ \delta V \\ \delta W \end{bmatrix} = \delta T_{cn} \hat{p}_n^{LT} + \hat{T}_{cn}(\delta p_n^{OT} - \delta p_n^{OL})$$

$$= \frac{\partial T_{cn}}{\partial \theta}\bigg|_{\wedge} \hat{p}_n^{LT} \delta\theta + \frac{\partial T_{cn}}{\partial \psi}\bigg|_{\wedge} \hat{p}_n^{LT} \delta\psi + \hat{T}_{cn} \delta p_n^{OT} - \hat{T}_{cn} \delta p_n^{OL}$$

$$= \begin{bmatrix} \frac{\partial U}{\partial \theta} \\ \frac{\partial V}{\partial \theta} \\ \frac{\partial W}{\partial \theta} \end{bmatrix}\bigg|_{\wedge} \delta\theta + \begin{bmatrix} \frac{\partial U}{\partial \psi} \\ \frac{\partial V}{\partial \psi} \\ \frac{\partial W}{\partial \psi} \end{bmatrix}\bigg|_{\wedge} \delta\psi + \begin{bmatrix} \frac{\partial U}{\partial N_T} & \frac{\partial U}{\partial E_T} & \frac{\partial U}{\partial D_T} \\ \frac{\partial V}{\partial N_T} & \frac{\partial V}{\partial E_T} & \frac{\partial V}{\partial D_T} \\ \frac{\partial W}{\partial N_T} & \frac{\partial W}{\partial E_T} & \frac{\partial W}{\partial D_T} \end{bmatrix}\bigg|_{\wedge} \begin{bmatrix} \delta N_T \\ \delta E_T \\ \delta D_T \end{bmatrix} + \begin{bmatrix} \frac{\partial U}{\partial N} & \frac{\partial U}{\partial E} & \frac{\partial U}{\partial D} \\ \frac{\partial V}{\partial N} & \frac{\partial V}{\partial E} & \frac{\partial V}{\partial D} \\ \frac{\partial W}{\partial N} & \frac{\partial W}{\partial E} & \frac{\partial W}{\partial D} \end{bmatrix}\bigg|_{\wedge} \begin{bmatrix} \delta N \\ \delta E \\ \delta D \end{bmatrix}$$

Therefore $$\begin{bmatrix} \frac{\partial U}{\partial \theta} \\ \frac{\partial V}{\partial \theta} \\ \frac{\partial W}{\partial \theta} \end{bmatrix}\bigg|_{\wedge} = \frac{\partial T_{cn}}{\partial \theta}\bigg|_{\wedge} \hat{p}_n^{LT}, \quad \begin{bmatrix} \frac{\partial U}{\partial \psi} \\ \frac{\partial V}{\partial \psi} \\ \frac{\partial W}{\partial \psi} \end{bmatrix}\bigg|_{\wedge} = \frac{\partial T_{cn}}{\partial \psi}\bigg|_{\wedge} \hat{p}_n^{LT},$$

$$\begin{bmatrix} \frac{\partial U}{\partial N_T} & \frac{\partial U}{\partial E_T} & \frac{\partial U}{\partial D_T} \\ \frac{\partial V}{\partial N_T} & \frac{\partial V}{\partial E_T} & \frac{\partial V}{\partial D_T} \\ \frac{\partial W}{\partial N_T} & \frac{\partial W}{\partial E_T} & \frac{\partial W}{\partial D_T} \end{bmatrix}\bigg|_{\wedge} = \hat{T}_{cn},$$

$$\begin{bmatrix} \frac{\partial U}{\partial N} & \frac{\partial U}{\partial E} & \frac{\partial U}{\partial D} \\ \frac{\partial V}{\partial N} & \frac{\partial V}{\partial E} & \frac{\partial V}{\partial D} \\ \frac{\partial W}{\partial N} & \frac{\partial W}{\partial E} & \frac{\partial W}{\partial D} \end{bmatrix}\bigg|_{\wedge} = -\hat{T}_{cn}$$

Image Recognition and Feature Extraction

The present invention will resort to available image recognition and feature extraction technologies as they are well matured today. A representative feature inside a recognized landmark is chosen for the position detection of the landmark.

This process will produce at least one set of imagery (pixel) coordinates of a feature correlating with a recognized landmark. Because of the image recognition, it is possible to obtain information of landmark attributes, for example, types and colors as well as absolute coordinates estimated by the algorithm described later. By associating with the present street, the facing street information is also available. In addition to that, because of the nature of feature extraction, the extracted feature is distinguishable from others by mathematical characteristics, for example, edge curvature gradient. Therefore, when revisited the same landmarks or encountering known famous landmarks, it can be identified as the one registered in the database by comparing the landmark attributes and mathematical feature characteristics.

Navigation Aided by Imagery

The present invention has developed the navigation method aided by the imagery measurements according to the Kalman filter procedure (Tool 3) with Tools 4 and 5. In case there are recognized landmarks whose positions are known or previously estimated, the present invention makes use of the imagery measurements as the additional measurements. The imagery measurements contain the pixel coordinates of the feature inside the recognized landmark and the position estimates of (the feature inside) the landmark given by the landmark database. In the present invention, it is assumed that the platform position and the perspective center position are identical to one another. According to the method described in this section, when known or previously estimated recognizable landmarks are available, the vehicle platform position and orientation estimates will be significantly improved compared with GPS-only navigation:

1. Set up nonlinear dynamics and measurement model:

$$x_{k+1} = f(x_k, u_k) \quad \text{State Equation}$$
$$z_k = h_k(x_k) + v_k \quad \text{Measurement Equation}$$

State Equation:

Define the state vector:

$$x_k = [N_k \; E_k \; D_k \; S_k \; \dot{S}_k \; \theta_k \; \dot{\theta}_k \; \psi_k \; \dot{\psi}_k]^T$$

where
  N: northerly displacement
  E: easterly displacement
  D: downward displacement
  S: speed of the vehicle
  $\dot{S}$: acceleration of the vehicle
  $\theta$: pitch angle of the vehicle
  $\psi$: yaw (azimuth) angle of the vehicle
  $\dot{\psi}$: yaw rate of the vehicle The nonlinear equation is given by the following using the time step of $\Delta T$:

$$\begin{bmatrix} N(k+1) \\ E(k+1) \\ D(k+1) \end{bmatrix} = \begin{bmatrix} N(k) \\ E(k) \\ D(k) \end{bmatrix} + l(k) \begin{bmatrix} \cos\theta_k \cos\psi_k \\ \cos\theta_k \sin\psi_k \\ -\sin\theta_k \end{bmatrix}$$

$l(k) = S(k)\Delta T + \frac{1}{2}\dot{S}(k)\Delta T^2$: travel distance along the $x_b$ axis $S(k+1) = S(k) + \dot{S}(k)\Delta T + w_S$; where $\sigma_S = 2$ m/s is the STD of $w_S$
$\dot{S}(k+1) = \dot{S}(k) + w_{\dot{S}}$; where $\sigma_{\dot{S}} = 1$ m/s$^2$ is the STD of $w_{\dot{S}}$
$\theta(k+1) = \theta(k) + w_\theta$; where $\sigma_\theta = 1$ deg is the STD of $w_\theta$
$\psi(k+1) = \psi(k) + \dot{\psi}(k)\Delta T + w_\psi$; where $\sigma_\psi = 10$ deg is the STD of $w_\psi$
$\dot{\psi}(k+1) = w_{\dot{\psi}}$; where $\sigma_{\dot{\psi}} = 1$ deg/s is the STD of $w_{\dot{\psi}}$ Measurement Equation:

-GPS Receiver Measurements-

Assume that a GPS receiver produces estimates of latitude $\phi_{GPS}$, longitude $\lambda_{GPS}$, $h_{GPS}$, speed S, northerly velocity $S_N$, easterly velocity $S_E$, downward velocity $S_D$, and their uncertainty information $\sigma_{\phi GPS}$, $\sigma_{\lambda GPS}$, $\sigma_{hGPS}$, $\sigma_{SGPS}$, $\sigma_{sNGPS}$, $\sigma_{sEGPS}$, $\sigma_{sDGPS}$ to build a loosely coupled system shown in FIG. 2B.

$$\begin{bmatrix} N_{GPS}(k) \\ E_{GPS}(k) \\ D_{GPS}(k) \end{bmatrix} = \begin{bmatrix} N(k) \\ E(k) \\ D(k) \end{bmatrix} + \begin{bmatrix} v_{\phi GPS} \\ v_{\lambda GPS} \\ v_{hGPS} \end{bmatrix}$$

Note that conversion from latitude and longitude to northerly and easterly displacements can be given by:

$N \cong R_N(\phi - \phi_0)$ $E \cong R_E(\lambda - \lambda_0)\cos(\phi)$ where $R_N$ is a meridian (North-South) radius of curvature and $R_E$ is an East-West radius of curvature.

$S_{GPS}(k) = S(k) + v_{SGPS}$ $$\begin{bmatrix} s_{NGPS}(k) \\ s_{EGPS}(k) \\ s_{DGPS}(k) \end{bmatrix} = S(k) \begin{bmatrix} \cos\theta_k \cos\psi_k \\ \cos\theta_k \sin\psi_k \\ -\sin\theta_k \end{bmatrix} + \begin{bmatrix} v_{sNGPS} \\ v_{sEGPS} \\ v_{sDGPS} \end{bmatrix}$$

where $v_{\phi GPS}$, $v_{\lambda GPS}$, $v_{hGPS}$, $v_{SGPS}$, $v_{sNGPS}$, $v_{sEGPS}$, $v_{sDGPS}$ are measurement errors modeled by white noises whose STDs are given by $\sigma_{\phi GPS}$, $\sigma_{\lambda GPS}$, $\sigma_{hGPS}$, $\sigma_{SGPS}$, $\sigma_{sNGPS}$, $\sigma_{sEGPS}$, $\sigma_{sDGPS}$. Ideally all the STD values are available from a GPS receiver, however, the velocity uncertainty information of $\sigma_{vNGPS}$, $\sigma_{vEGPS}$, and $\sigma v_{DGPS}$ are often not available. Use of a constant number, e.g., $\sigma_{vNGPS}=2$ m/s, will result in better performance than not using the velocity information.

-Imagery Sensor Measurements-

Although there could be more than one recognizable landmarks in one image giving twice number of measurements (one set of $x_c$ and $y_c$ per one imagery feature), assume that there is one recognized landmark for simplicity. Imagery measurement equation is given by frame camera collinearity equations:

$$x_c = -f\frac{U}{W} + v_{xc}$$

$$y_c = -f\frac{V}{W} + v_{yc}$$

where $v_{xc}$ and $v_{yc}$ are measurement errors modeled by white noises whose STDs are given by $\sigma_{xc}$ and $\sigma_{yc}$. Assuming known or estimated landmark position accuracy is good, these values can be a pixel size ($10^{-6}$ m order) of the CCD camera in use to reflect discretization errors.

2. Prepare linearized small perturbation equations:

| | |
|---|---|
| $\delta x_{k+1} = \Phi(\hat{x}_k)\delta x_k + \Gamma_k w_k$ | State Small Perturbation Equation |
| $\delta z_k = H(\hat{x}_k)\delta x_k + v_k$ | Measurement Small Perturbation Equation |

State Small Perturbation Equation:

$$\begin{bmatrix} \delta N_{k+1} \\ \delta E_{k+1} \\ \delta D_{k+1} \end{bmatrix} = \begin{bmatrix} \delta N_k \\ \delta E_k \\ \delta D_k \end{bmatrix} + \begin{bmatrix} \cos\hat{\theta}_k \cos\hat{\psi}_k \\ \cos\hat{\theta}_k \sin\hat{\psi}_k \\ -\sin\hat{\theta}_k \end{bmatrix} \Delta T \delta S + \begin{bmatrix} \cos\hat{\theta}_k \cos\hat{\psi}_k \\ \cos\hat{\theta}_k \sin\hat{\psi}_k \\ -\sin\hat{\theta}_k \end{bmatrix}$$

$$\frac{1}{2}\Delta T^2 \delta \dot{S} + \begin{bmatrix} -\sin\hat{\theta}_k \cos\hat{\psi}_k \\ -\sin\hat{\theta}_k \sin\hat{\psi}_k \\ -\cos\hat{\theta}_k \end{bmatrix} \hat{I}_k \delta\theta + \begin{bmatrix} -\cos\hat{\theta}_k \sin\hat{\psi}_k \\ \cos\hat{\theta}_k \cos\hat{\psi}_k \\ 0 \end{bmatrix} \hat{I}_k \delta\psi$$

$\delta S(k+1) = \delta S(k) + \delta \dot{S}(k)\Delta T + w_S$ $\delta \dot{S}(k+1) = \delta \dot{S}(k) + w_{\dot{S}}$ $\delta \theta(k+1) = \delta \theta(k) + w_\theta$ $\delta \psi(k+1) = \delta \psi(k) + \delta \dot{\psi}(k)\Delta T$ $\delta \dot{\psi}(k+1) = w_{\dot{\psi}}$ Measurement Small Perturbation Equation:

-GPS Measurements- $$\begin{bmatrix} \delta N_{GPS}(k) \\ \delta E_{GPS}(k) \\ \delta D_{GPS}(k) \end{bmatrix} = \begin{bmatrix} \delta N(k) \\ \delta E(k) \\ \delta D(k) \end{bmatrix} + \begin{bmatrix} v_{\varphi GPS} \\ v_{\lambda GPS} \\ v_{hGPS} \end{bmatrix} \quad (1.1)$$

$\delta S_{GPS}(k) = \delta S(k) + v_{SGPS}$ $$\begin{bmatrix} \delta s_{Nk} \\ \delta s_{Ek} \\ \delta s_{Dk} \end{bmatrix} = \begin{bmatrix} \cos\hat{\theta}_k \cos\hat{\psi}_k \\ \cos\hat{\theta}_k \sin\hat{\psi}_k \\ -\sin\hat{\theta}_k \end{bmatrix} \delta S + \begin{bmatrix} -\sin\hat{\theta}_k \cos\hat{\psi}_k \\ -\sin\hat{\theta}_k \sin\hat{\psi}_k \\ -\cos\hat{\theta}_k \end{bmatrix}$$

$$\hat{S}_k \delta\theta + \begin{bmatrix} -\cos\hat{\theta}_k \sin\hat{\psi}_k \\ \cos\hat{\theta}_k \cos\hat{\psi}_k \\ 0 \end{bmatrix} \hat{S}_k \delta\psi$$

-Imagery Measurements-

These linearized small perturbation equation for photogrammetric measurements can be given as follows:

$$\delta x_c = \left.\frac{\partial x_c}{\partial \theta}\right|_\wedge \delta\theta + \left.\frac{\partial x_c}{\partial \psi}\right|_\wedge \delta\psi + \left.\frac{\partial x_c}{\partial N}\right|_\wedge \delta N + \left.\frac{\partial x_c}{\partial E}\right|_\wedge \delta E + \left.\frac{\partial x_c}{\partial D}\right|_\wedge \delta D + v_{xc}$$

$$\delta y_c = \left.\frac{\partial y_c}{\partial \theta}\right|_\wedge \delta\theta + \left.\frac{\partial y_c}{\partial \psi}\right|_\wedge \delta\psi + \left.\frac{\partial y_c}{\partial N}\right|_\wedge \delta N + \left.\frac{\partial y_c}{\partial E}\right|_\wedge \delta E + \left.\frac{\partial y_c}{\partial D}\right|_\wedge \delta D + v_{yc}$$

Note that, in the navigation side, landmark position estimates are not corrected. Each coefficient of partial derivative can be found in Tool 5 as:

$$\left.\frac{\partial x_c}{\partial q}\right|_\wedge = -\frac{f}{\hat{W}}\left(\left.\left(\frac{\partial U}{\partial q}\right)\right|_\wedge - \frac{\hat{U}}{\hat{W}}\left.\left(\frac{\partial W}{\partial q}\right)\right|_\wedge\right)$$

$$\left.\frac{\partial y_c}{\partial q}\right|_\wedge = -\frac{f}{\hat{W}}\left(\left.\left(\frac{\partial V}{\partial q}\right)\right|_\wedge - \frac{\hat{V}}{\hat{W}}\left.\left(\frac{\partial W}{\partial q}\right)\right|_\wedge\right)$$

$q \in \{N, E, D, \theta, \psi, N_T, E_T, D_T\}$ $$\begin{bmatrix} \frac{\partial U}{\partial \theta} \\ \frac{\partial V}{\partial \theta} \\ \frac{\partial W}{\partial \theta} \end{bmatrix}_\wedge = \left.\frac{\partial T_{cn}}{\partial \theta}\right|_\wedge \hat{p}_n^{LT}$$

$$\begin{bmatrix} \frac{\partial U}{\partial \psi} \\ \frac{\partial V}{\partial \psi} \\ \frac{\partial W}{\partial \psi} \end{bmatrix}_\wedge = \left.\frac{\partial T_{cn}}{\partial \psi}\right|_\wedge \hat{p}_n^{LT},$$

$$\begin{bmatrix} \frac{\partial U}{\partial N} & \frac{\partial U}{\partial E} & \frac{\partial U}{\partial D} \\ \frac{\partial V}{\partial N} & \frac{\partial V}{\partial E} & \frac{\partial V}{\partial D} \\ \frac{\partial W}{\partial N} & \frac{\partial W}{\partial E} & \frac{\partial W}{\partial D} \end{bmatrix}_\wedge = -\hat{T}_{cn}$$

$$\begin{bmatrix} \frac{\partial U}{\partial N_T} & \frac{\partial U}{\partial E_T} & \frac{\partial U}{\partial D_T} \\ \frac{\partial V}{\partial N_T} & \frac{\partial V}{\partial E_T} & \frac{\partial V}{\partial D_T} \\ \frac{\partial W}{\partial N_T} & \frac{\partial W}{\partial E_T} & \frac{\partial W}{\partial D_T} \end{bmatrix}_\wedge = \hat{T}_{cn}$$

According to the derivations so far, the transient matrix $\Phi(x_k)$ and measurement matrix $H(\hat{x}_k)$ are obtained as follows:

| | $\Phi(X_k)$ | | | | | | | | $\Gamma_k$ | | | | | |
|---|---|---|---|---|---|---|---|---|---|---|---|---|---|---|
| | $\delta N_k$ | $\delta E_k$ | $\delta D_k$ | $\delta S_k$ | $\delta \dot{S}_k$ | $\delta\theta_k$ | $\delta\psi_k$ | $\delta\dot{\psi}_k$ | | | | | | |
| $\delta N_{k+1}$ | 1 | 0 | 0 | $\cos\theta\cos\psi$ $\Delta T$ | $\cos\theta\cos\psi$ $0.5\Delta T^2$ | $-\sin\theta\cos\psi$ 1 | $-\cos\theta\sin\psi$ 1 | 0 | 0 | 0 | 0 | 0 | 0 | $w_S$ |
| $\delta E_{k+1}$ | 0 | 1 | 0 | $\cos\theta\sin\psi$ $\Delta T$ | $\cos\theta\sin\psi$ $0.5\Delta T^2$ | $-\sin\theta\sin\psi$ 1 | $\cos\theta\cos\psi$ 1 | 0 | 0 | 0 | 0 | 0 | 0 | $w_{\dot{S}}$ |

-continued

| | | | | | $\Phi(X_k)$ | | | | | | $\Gamma_k$ | | | | |
|---|---|---|---|---|---|---|---|---|---|---|---|---|---|---|---|
| | $\delta N_k$ | $\delta E_k$ | $\delta D_k$ | $\delta S_k$ | $\delta \dot{S}_k$ | $\delta \theta_k$ | $\delta \psi_k$ | $\delta \dot{\psi}_k$ | | | | | | | |
| $\delta D_{k+1}$ | 0 | 0 | 1 | $-\sin\theta\,\Delta T$ | $-\sin\theta\,0.5\Delta T^2$ | $-\cos\theta\,1$ | 0 | 0 | | 0 | 0 | 0 | 0 | 0 | $w_\theta$ |
| $\delta S_{k+1}$ = | 0 | 0 | 0 | 1 | $\Delta T$ | 0 | 0 | 0 | $\delta x_k$ + | 1 | 0 | 0 | 0 | 0 | $w_\psi$ |
| $\delta \dot{S}_{k+1}$ | 0 | 0 | 0 | 0 | 1 | 0 | 0 | 0 | | 0 | 1 | 0 | 0 | 0 | $w_{\dot\psi}$ |
| $\delta \theta_{k+1}$ | 0 | 0 | 0 | 0 | 0 | 1 | 0 | 0 | | 0 | 0 | 1 | 0 | 0 | |
| $\delta \psi_{k+1}$ | 0 | 0 | 0 | 0 | 0 | 0 | 1 | $\Delta T$ | | 0 | 0 | 0 | 1 | 0 | |
| $\delta \dot\psi_{k+1}$ | 0 | 0 | 0 | 0 | 0 | 0 | 0 | 1 | | 0 | 0 | 0 | 0 | 1 | |

| | | | | | $H(\hat{x}_k)$ | | | | | |
|---|---|---|---|---|---|---|---|---|---|---|
| | $\delta N(k)$ | $\delta E(k)$ | $\delta D(k)$ | $\delta S(k)$ | $\delta \dot S(k)$ | $\delta \theta(k)$ | $\delta \psi(k)$ | $\delta \dot\psi(k)$ | | |
| $\delta N_{GPS}$ | 1 | 0 | 0 | 0 | 0 | 0 | 0 | 0 | | $v_{\phi GPS}$ |
| $\delta E_{GPS}$ | 0 | 1 | 0 | 0 | 0 | 0 | 0 | 0 | | $v_{\lambda GPS}$ |
| $\delta D_{GPS}$ = | 0 | 0 | 1 | 0 | 0 | 0 | 0 | 0 | $\delta x(k)$ + | $v_{hGPS}$ |
| $\delta S_{GPS}$ | 0 | 0 | 0 | 1 | 0 | 0 | 0 | 0 | | |
| $\delta s_{NGPS}$ | 0 | 0 | 0 | $\cos\theta\cos\psi$ | 0 | $-\sin\theta\cos\psi\,S$ | $-\cos\theta\sin\psi\,S$ | 0 | | |
| $\delta s_{EGPS}$ | 0 | 0 | 0 | $\cos\theta\sin\psi$ | 0 | $-\sin\theta\sin\psi\,S$ | $\cos\theta\cos\psi\,S$ | 0 | | |
| $\delta s_{DGPS}$ | 0 | 0 | 0 | $-\sin\theta$ | 0 | $-\cos\theta\,S$ | 0 | 0 | | |
| $\delta x_c$ | $\left.\frac{\partial x_c}{\partial N}\right|_\wedge$ | $\left.\frac{\partial x_c}{\partial E}\right|_\wedge$ | $\left.\frac{\partial x_c}{\partial D}\right|_\wedge$ | 0 | 0 | $\left.\frac{\partial x_c}{\partial \theta}\right|_\wedge$ | $\left.\frac{\partial x_c}{\partial \psi}\right|_\wedge$ | 0 | | |
| $\delta y_c$ | $\left.\frac{\partial y_c}{\partial N}\right|_\wedge$ | $\left.\frac{\partial y_c}{\partial E}\right|_\wedge$ | $\left.\frac{\partial y_c}{\partial D}\right|_\wedge$ | 0 | 0 | $\left.\frac{\partial y_c}{\partial \theta}\right|_\wedge$ | $\left.\frac{\partial y_c}{\partial \psi}\right|_\wedge$ | 0 | | |

$$\left.\frac{\partial x_c}{\partial q}\right|_\wedge = -\frac{f}{\hat{W}}\left(\left.\left(\frac{\partial U}{\partial q}\right)\right|_\wedge - \frac{\hat{U}}{\hat{W}}\left.\left(\frac{\partial W}{\partial q}\right)\right|_\wedge\right)$$

$$\left.\frac{\partial y_c}{\partial q}\right|_\wedge = -\frac{f}{\hat{W}}\left(\left.\left(\frac{\partial V}{\partial q}\right)\right|_\wedge - \frac{\hat{V}}{\hat{W}}\left.\left(\frac{\partial W}{\partial q}\right)\right|_\wedge\right)$$

$q \in \{N, E, D, \theta, \psi, N_T, E_T, D_T\}$ $$\left.\begin{bmatrix}\frac{\partial U}{\partial \theta}\\ \frac{\partial V}{\partial \theta}\\ \frac{\partial W}{\partial \theta}\end{bmatrix}\right|_\wedge = \left.\frac{\partial T_{cn}}{\partial \theta}\right|_\wedge \hat{p}_n^{LT}$$

$$\left.\begin{bmatrix}\frac{\partial U}{\partial \psi}\\ \frac{\partial V}{\partial \psi}\\ \frac{\partial W}{\partial \psi}\end{bmatrix}\right|_\wedge = \left.\frac{\partial T_{cn}}{\partial \psi}\right|_\wedge \hat{p}_n^{LT}$$

$$\left.\begin{bmatrix}\frac{\partial U}{\partial N} & \frac{\partial U}{\partial E} & \frac{\partial U}{\partial D}\\ \frac{\partial V}{\partial N} & \frac{\partial V}{\partial E} & \frac{\partial V}{\partial D}\\ \frac{\partial W}{\partial N} & \frac{\partial W}{\partial E} & \frac{\partial W}{\partial D}\end{bmatrix}\right|_\wedge = -\hat{T}_{cn}$$

-continued $$\left.\begin{bmatrix}\frac{\partial U}{\partial N_T} & \frac{\partial U}{\partial E_T} & \frac{\partial U}{\partial D_T}\\ \frac{\partial V}{\partial N_T} & \frac{\partial V}{\partial E_T} & \frac{\partial V}{\partial D_T}\\ \frac{\partial W}{\partial N_T} & \frac{\partial W}{\partial E_T} & \frac{\partial W}{\partial D_T}\end{bmatrix}\right|_\wedge = \hat{T}_{cn}$$

3. Propagate nonlinear state equations and the covariance:

$\hat{x}_{k+1}^- = f(\hat{x}_k^-, u_k)$ State Propagation $P_{k+1}^- = \Phi_k P_k^- \Phi_k^T + \Gamma_k Q_k \Gamma_k^T$ Covariance Propagation where $$Q_k = E[w_k w_k^T] = \begin{bmatrix} \sigma_s^2 & 0 & 0 & 0 & 0 \\ 0 & \sigma_{\dot s}^2 & 0 & 0 & 0 \\ 0 & 0 & \sigma_\theta^2 & 0 & 0 \\ 0 & 0 & 0 & \sigma_\psi^2 & 0 \\ 0 & 0 & 0 & 0 & \sigma_{\dot\psi}^2 \end{bmatrix}$$

$\sigma_s = 2$ m/s, $\sigma_{\dot s} = 1$ m/s$^2$, $\sigma_\theta = 1$ deg, $\sigma_\psi = 10$ deg, $\sigma_{\dot\psi} = 1$ deg/s 4. Perform Local Iteration: iterate for i=1 through n until convergence $$K_{k,i} = P_k^- H_k^T(\hat{x}_{k,i}^+)(H_k(\hat{x}_{k,i}^+)P_k^- H_k^T(\hat{x}_{k,i}^+) + R_k)^{-1} \text{ Kalman Gain}$$

$$\hat{x}_{k,i+1}^+ = \hat{x}_k^- + K_{k,i}[z_k - h_k(\hat{x}_{k,i}^+) - H_k(\hat{x}_{k,i}^+)(\hat{x}_k^- - \hat{x}_{k,i}^+)] \text{ State Correction}$$

$$P_{k,i+1}^+ = (I - K_{k,i}H_k(\hat{x}_{k,i}^+))P_k^- \text{ Covariance Correction}$$

where $$R_k = E[v_k v_k^T] =$$

$$\begin{bmatrix} \sigma_{\varphi GPS}^2 & & & & & & & & & \\ & \sigma_{\lambda GPS}^2 & & & & & \vdots & & & \\ & & \sigma_{hGPS}^2 & & & \cdots & 0 & \cdots & & \\ & & & \sigma_S^2 & & & \vdots & & & \\ & & & & \sigma_{sNGPS}^2 & & & & & \\ & & \vdots & & & \sigma_{sEGPS}^2 & & & & \\ & \cdots & 0 & \cdots & & & \sigma_{sDGPS}^2 & & & \\ & & \vdots & & & & & \sigma_{xc}^2 & \\ & & & & & & & & \sigma_{yc}^2 \end{bmatrix}$$

5. Sequentially repeat the steps 3 and 4

Landmark Positioning

In case of known or previously estimated recognizable landmarks are available, the previously Navigation Aided by Imagery procedure will provide very accurate platform position and orientation estimates. On this basis, the present invention simultaneously estimates unknown recognized landmark positions to create the landmark database in real-time. It should be noted that this process can be executed only when known or previously estimated landmarks are available. To develop Landmark Positioning technology, the present invention again resorts to the Kalman filter procedure (Tool 3) with Tools 4 and 5:

Initialization

To obtain relatively accurate initial estimation of the recognized landmark positions, the present invention uses the least squares method to find the initial estimates of $$p_n^{OT} = \begin{bmatrix} N_T \\ E_T \\ D_T \end{bmatrix}$$

using multiple images and estimated platform position/orientation. An example of the initialization procedure is as follows:

$$p_c^{Lt} = \mu T_{cn} p_n^{LT} \text{ or}$$

$$\begin{bmatrix} x_c \\ y_c \\ -f \end{bmatrix} = \mu T_{cn} \left( \begin{bmatrix} N_T \\ E_T \\ D_T \end{bmatrix} - \begin{bmatrix} N \\ E \\ D \end{bmatrix} \right) \text{ or}$$

$$\frac{1}{\mu} T_{nc} \begin{bmatrix} x_c \\ y_c \\ -f \end{bmatrix} = \left( \begin{bmatrix} N_T \\ E_T \\ D_T \end{bmatrix} - \begin{bmatrix} N \\ E \\ D \end{bmatrix} \right) \text{ or,}$$

-continued $$\frac{1}{\mu}(T_{cn}(1,1)x_c + T_{cn}(2,1)y_c - T_{cn}(3,1)f) = N_T - N$$

$$\frac{1}{\mu}(T_{cn}(1,2)x_c + T_{cn}(2,2)y_c - T_{cn}(3,2)f) = E_T - E$$

$$\frac{1}{\mu}(T_{cn}(1,3)x_c + T_{cn}(2,3)y_c - T_{cn}(3,3)f) = D_T - D$$

The last equation provides $$\frac{1}{\mu} = \frac{D_T - D}{(T_{cn}(1,3)x_c + T_{cn}(2,3)y_c - T_{cn}(3,3)f)}$$

Substitution of this into the first two equations will give $$\frac{(T_{cn}(1,1)x_c + T_{cn}(2,1)y_c - T_{cn}(3,1)f)}{(T_{cn}(1,3)x_c + T_{cn}(2,3)y_c - T_{cn}(3,3)f)}(D_T - D) = N_T - N$$

$$\frac{(T_{cn}(1,2)x_c + T_{cn}(2,2)y_c - T_{cn}(3,2)f)}{(T_{cn}(1,3)x_c + T_{cn}(2,3)y_c - T_{cn}(3,3)f)}(D_T - D) = E_T - E$$

Letting $$c_1 = \frac{(T_{cn}(1,1)x_c + T_{cn}(2,1)y_c - T_{cn}(3,1)f)}{(T_{cn}(1,3)x_c + T_{cn}(2,3)y_c - T_{cn}(3,3)f)}$$

$$c_2 = \frac{(T_{cn}(1,2)x_c + T_{cn}(2,2)y_c - T_{cn}(3,2)f)}{(T_{cn}(1,3)x_c + T_{cn}(2,3)y_c - T_{cn}(3,3)f)}$$

results in $$c_1(D_T-D)=N_T-N$$

$$c_2(D_T-D)=E_T-E$$

or $$c_1 D_T - c_1 D = N_T - N$$

$$c_2 D_T - c_2 D = E_T - E$$

Rearranging, $$N_T - c_1 D_T = N - c_1 D$$

$$E_T - c_2 D_T = E - c_2 D$$

or $$\begin{bmatrix} 1 & 0 & -c_1 \\ 0 & 1 & -c_2 \end{bmatrix} \begin{bmatrix} N_T \\ E_T \\ D_T \end{bmatrix} = \begin{bmatrix} N - c_1 D \\ E - c_2 D \end{bmatrix}$$

This is equivalent to the following familiar form to solve an elementary least squares problem:

$$Ax=b$$

Since there are three unknowns of ($N_T$, $E_T$, $D_T$), at least three data are necessary. One image frame gives two data: $x_c$ and $y_c$. Therefore, at least two images are necessary.

In general, in case there are i number of images, the above equation looks like $$\begin{bmatrix} 1 & 0 & -c_{1,1} \\ 0 & 1 & -c_{2,1} \\ 1 & 0 & -c_{1,2} \\ 0 & 1 & -c_{2,2} \\ \ldots \\ 1 & 0 & -c_{1,i} \\ 0 & 1 & -c_{2,i} \end{bmatrix} \begin{bmatrix} N_T \\ E_T \\ D_T \end{bmatrix} = \begin{bmatrix} N_1 - c_{1,1} D_1 \\ E_1 - c_{2,1} D_1 \\ N_2 - c_{1,2} D_2 \\ E_2 - c_{2,2} D_2 \\ \ldots \\ N_i - c_{1,i} D_i \\ E_i - c_{2,i} D_i \end{bmatrix}$$

The least squares solution is given by $$x = \begin{bmatrix} N_T \\ E_T \\ D_T \end{bmatrix} = (A^T A)^{-1} A^T b$$

Kalman Filtering

After obtaining the initial estimates of $p_n^{OT}$, the present invention pass them to the Kalman filtering estimation procedure:

1. Set up nonlinear dynamics and measurement model:

$$x_{k+1} = f(x_k, u_k) \quad \text{State Equation}$$

$$z_k = h_k(x_k) + v_k \quad \text{Measurement Equation}$$

State Equation $$\begin{bmatrix} N_T(k+1) \\ E_T(k+1) \\ D_T(k+1) \end{bmatrix} = \begin{bmatrix} N_T(k) \\ E_T(k) \\ D_T(k) \end{bmatrix}; \text{where } x_k = \begin{bmatrix} N_T(k) \\ E_T(k) \\ D_T(k) \end{bmatrix}$$

Measurement Equation $$x_c = -f \frac{U}{W} + v_{xc}$$

$$y_c = -f \frac{V}{W} + v_{yc}$$

The sizes for $\sigma_{xc}$ and $\sigma_{yc}$ can be a pixel size ($10^{-6}$ m order) to a multiple of a pixel size taking into account navigation errors.

2. Prepare linearized small perturbation equations:

$$\delta x_{k+1} = \Phi(\hat{x}_k) \delta x_k + \Gamma_k w_k \quad \text{State Small Perturbation Equation}$$

$$\delta z_k = H(\hat{x}_k) \delta x_k + v_k \quad \text{Measurement Small Perturbation Equation}$$

State Small Perturbation Equation $$\begin{bmatrix} \delta N_T(k+1) \\ \delta E_T(k+1) \\ \delta D_T(k+1) \end{bmatrix} = \begin{bmatrix} \delta N_T(k) \\ \delta E_T(k) \\ \delta D_T(k) \end{bmatrix}; \text{where } \Phi(\hat{x}_k) = \begin{bmatrix} 1 & 0 & 0 \\ 0 & 1 & 0 \\ 0 & 0 & 1 \end{bmatrix}, \Gamma_k = 0$$

Measurement Small Perturbation Equation $$\delta x_c = \frac{\partial x_c}{\partial N_T}\bigg|_{\wedge} \delta N_T + \frac{\partial x_c}{\partial E_T}\bigg|_{\wedge} \delta E_T + \frac{\partial x_c}{\partial D_T}\bigg|_{\wedge} \delta D_T + v_{xc}$$

$$\delta y_c = \frac{\partial y_c}{\partial N_T}\bigg|_{\wedge} \delta N_T + \frac{\partial y_c}{\partial E_T}\bigg|_{\wedge} \delta E_T + \frac{\partial y_c}{\partial D_T}\bigg|_{\wedge} \delta D_T + v_{yc}$$

In the photogrammetry side, navigation estimates are not corrected. Again, each coefficient of partial derivative can be found in Tool 5 as:

$$\frac{\partial x_c}{\partial q}\bigg|_{\wedge} = -\frac{f}{\hat{W}}\left(\left(\frac{\partial U}{\partial q}\right)\bigg|_{\wedge} - \frac{\hat{U}}{\hat{W}}\left(\frac{\partial W}{\partial q}\right)\bigg|_{\wedge}\right)$$

$$\frac{\partial y_c}{\partial q}\bigg|_{\wedge} = -\frac{f}{\hat{W}}\left(\left(\frac{\partial V}{\partial q}\right)\bigg|_{\wedge} - \frac{\hat{V}}{\hat{W}}\left(\frac{\partial W}{\partial q}\right)\bigg|_{\wedge}\right)$$

$$q \in \{N, E, D, \theta, \psi, N_T, E_T, D_T\}$$

-continued $$\begin{bmatrix} \frac{\partial U}{\partial \theta} \\ \frac{\partial V}{\partial \theta} \\ \frac{\partial W}{\partial \theta} \end{bmatrix}\bigg|_{\wedge} = \frac{\partial T_{cn}}{\partial \theta}\bigg|_{\wedge} \hat{p}_n^{LT}$$

$$\begin{bmatrix} \frac{\partial U}{\partial \psi} \\ \frac{\partial V}{\partial \psi} \\ \frac{\partial W}{\partial \psi} \end{bmatrix}\bigg|_{\wedge} = \frac{\partial T_{cn}}{\partial \psi}\bigg|_{\wedge} \hat{p}_n^{LT},$$

$$\begin{bmatrix} \frac{\partial U}{\partial N} & \frac{\partial U}{\partial E} & \frac{\partial U}{\partial D} \\ \frac{\partial V}{\partial N} & \frac{\partial V}{\partial E} & \frac{\partial V}{\partial D} \\ \frac{\partial W}{\partial N} & \frac{\partial W}{\partial E} & \frac{\partial W}{\partial D} \end{bmatrix}\bigg|_{\wedge} = -\hat{T}_{cn}$$

$$\begin{bmatrix} \frac{\partial U}{\partial N_T} & \frac{\partial U}{\partial E_T} & \frac{\partial U}{\partial D_T} \\ \frac{\partial V}{\partial N_T} & \frac{\partial V}{\partial E_T} & \frac{\partial V}{\partial D_T} \\ \frac{\partial W}{\partial N_T} & \frac{\partial W}{\partial E_T} & \frac{\partial W}{\partial D_T} \end{bmatrix}\bigg|_{\wedge} = \hat{T}_{cn}$$

$\delta z_k = H(\hat{x}_k)\delta x_k + v_k$ is given by:

|  | $\delta N_T$ | $\delta E_T$ | $\delta D_T$ |  |  |  |
|---|---|---|---|---|---|---|
| $\delta x_c$ | $\frac{\partial x_c}{\partial N_T}\big|_{\wedge}$ | $\frac{\partial x_c}{\partial E_T}\big|_{\wedge}$ | $\frac{\partial x_c}{\partial D_T}\big|_{\wedge}$ | $\delta x_k$ | + | $v_{xc}$ |
| $\delta y_c$ | $\frac{\partial y_c}{\partial N_T}\big|_{\wedge}$ | $\frac{\partial y_c}{\partial E_T}\big|_{\wedge}$ | $\frac{\partial y_c}{\partial D_T}\big|_{\wedge}$ |  |  | $v_{yc}$ |

3. Propagate nonlinear state equations and the covariance:

$$\hat{x}_{k+1}^- = f(\hat{x}_k^-, u_k) \quad \text{State Propagation}$$

$$P_{k+1}^- = \Phi_k P_k^- \Phi_k^T + \Gamma_k Q_k \Gamma_k^T \quad \text{Covariance Propagation}$$

The state propagation is trivial in this case since the stationary model is used: no change in estimates. The covariance propagation also reduces to the stationary model, or $$P_{k+1}^- = P_k^- \text{ since } \Phi(\hat{x}_k) = \begin{bmatrix} 1 & 0 & 0 \\ 0 & 1 & 0 \\ 0 & 0 & 1 \end{bmatrix} \text{ and } \Gamma_k = 0$$

4. Perform Local Iteration: iterate for i=1 through n until convergence $$K_{k,i} = P_k^- H_k^T(\hat{x}_{k,i}^+)(H_k(\hat{x}_{k,i}^+)P_k^- H_k^T(\hat{x}_{k,i}^+) + R_k)^{-1} \quad \text{Kalman Gain}$$

$$\hat{x}_{k,i+1}^+ = \hat{x}_k^- + K_{k,i}[z_k - h_k(\hat{x}_{k,i}^+) - H_k(\hat{x}_{k,i}^+)(\hat{x}_k^- - \hat{x}_{k,i}^+)] \quad \text{State Correction}$$

$$P_{k,i+1}^+ = (I - K_{k,i}H_k(\hat{x}_{k,i}^+))P_k^- \quad \text{Covariance Correction}$$

where $$R_k = E[v_k v_k^T] = \begin{bmatrix} \sigma_{xc}^2 & 0 \\ 0 & \sigma_{yc}^2 \end{bmatrix}$$

5. Sequentially repeat the steps 3 and 4 (end)

Simulation Results

Figure 7:
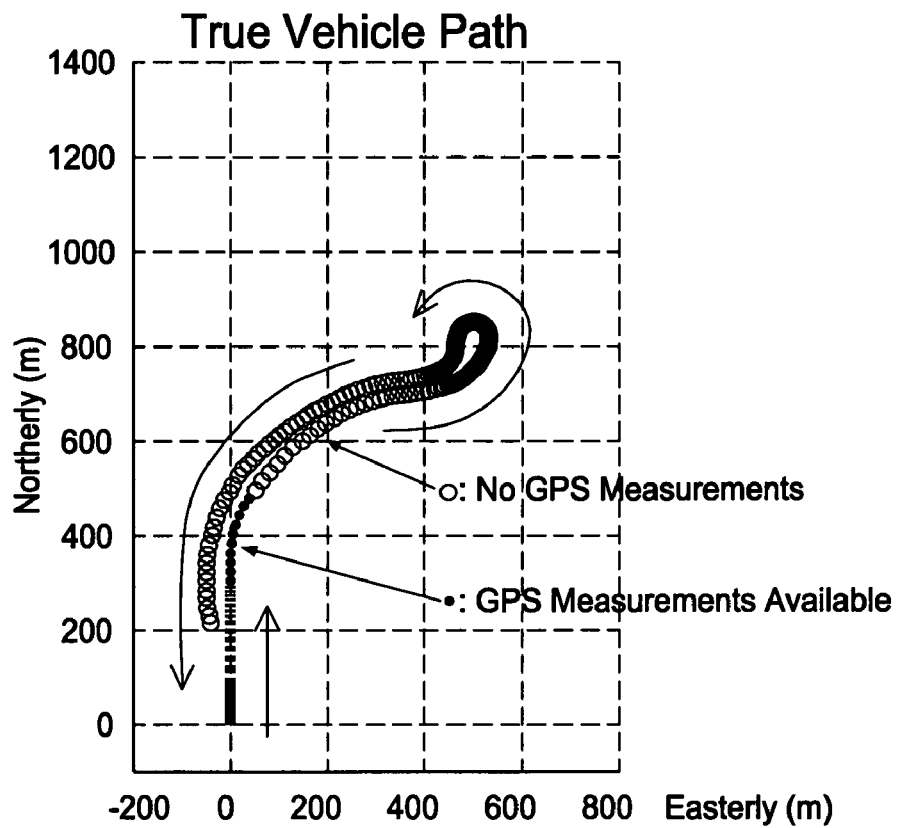
FIG. 7 is a graph showing the simulated vehicle true path including a GPS outage period indicated by circles.
Figure 8:
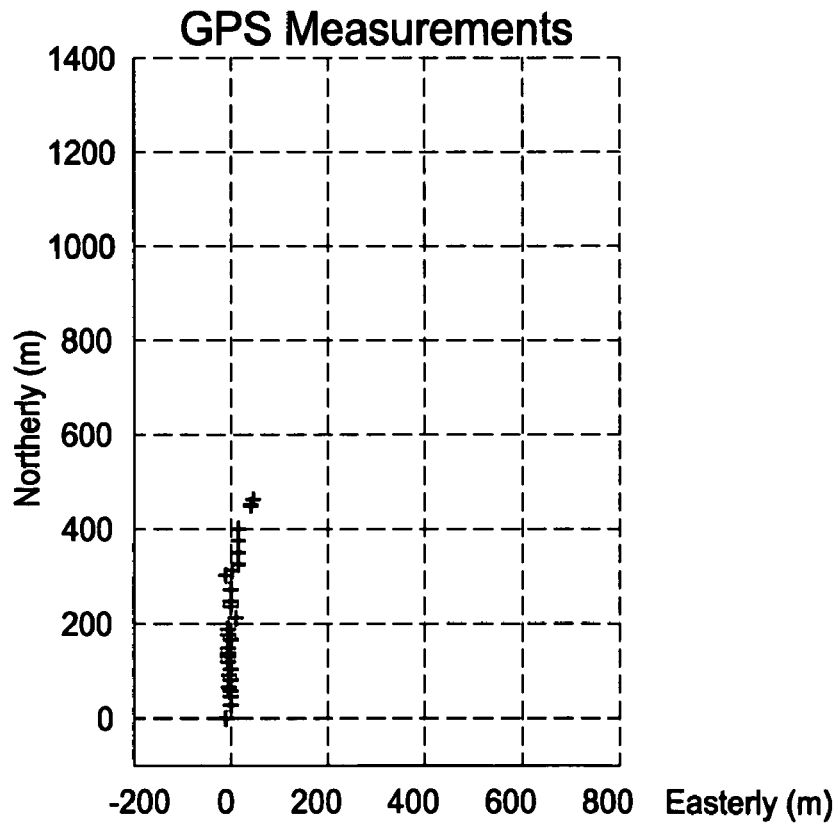
FIG. 8 is a graph showing the available GPS position estimates for the vehicle path associated with the situation of FIG. 7.
Figure 9:
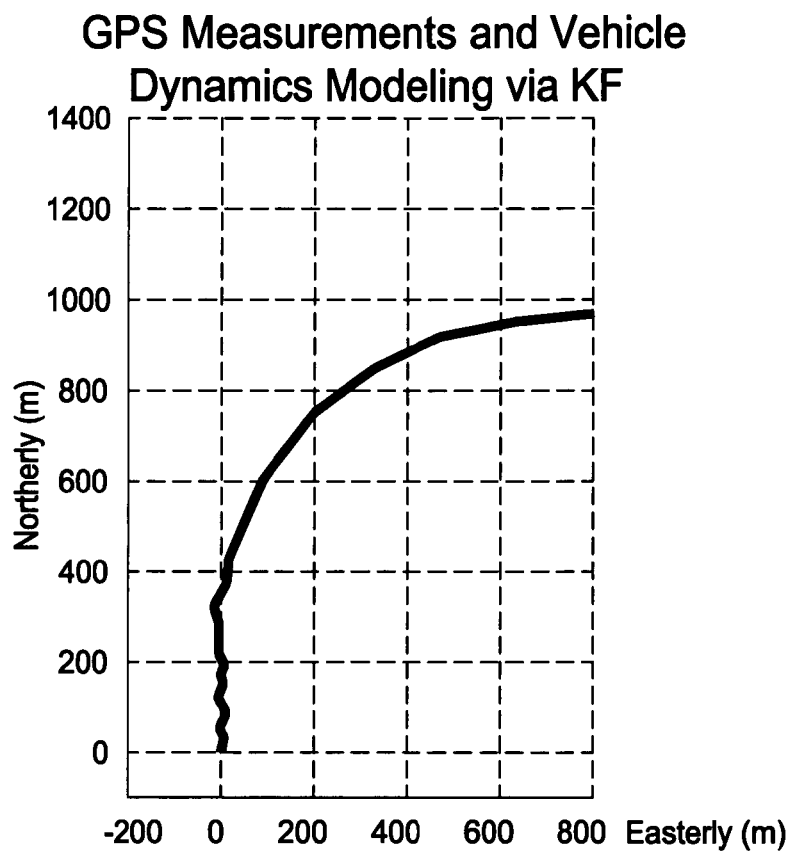
FIG. 9 is a graph showing the vehicle path estimated by a Kalman filtering architecture with GPS measurements and a vehicle dynamics model associated with the situation of FIGS. 7 and 8.

The method and performance of the introduced technology will be clearer by the simulation results with reference to FIGS. 7-14. FIG. 7 shows the simulated true vehicle path in which the path with available GPS measurements are represented by dots (●) and the path with no GPS measurements is represented by circles (○). As shown in FIG. 8, GPS measurements are available only in the beginning (better than 10 m accuracy when available) of the travel. Therefore, there is no clue about where the vehicle location is after GPS acquisition is lost. Even for an automotive navigation system equipped with a vehicle dynamics model in the Kalman filtering architecture, one or more turns after the GPS dropout will result in clueless positioning as shown in FIG. 9.

Figure 10:
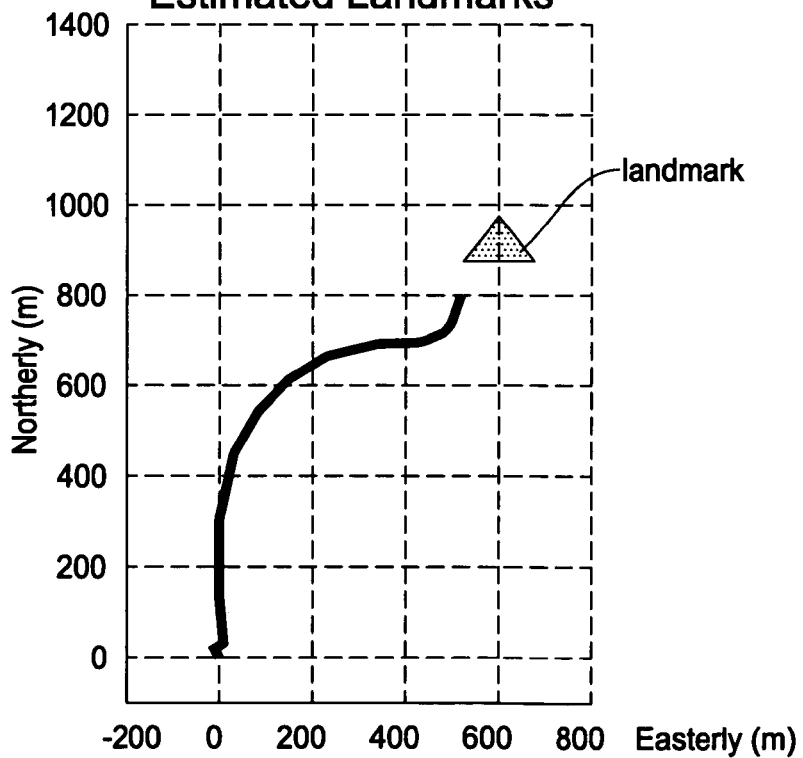
FIG. 10 is a graph showing the vehicle path with imagery measurement of known or previously estimated landmark in addition to GPS measurements in accordance with the present invention.

The first benefit of the imagery measurements of the present invention is achieved by taking images of known or previously estimated landmarks represented by a triangle (Δ) in FIG. 10. As long as there exist available known or previously estimated landmarks, FIG. 10 shows that accurate navigation is guaranteed according to the process of navigation aided by imagery. The simulation is halted in the middle of the simulation in FIG. 10 when the imagery of the triangle landmark becomes unavailable.

Figure 11:
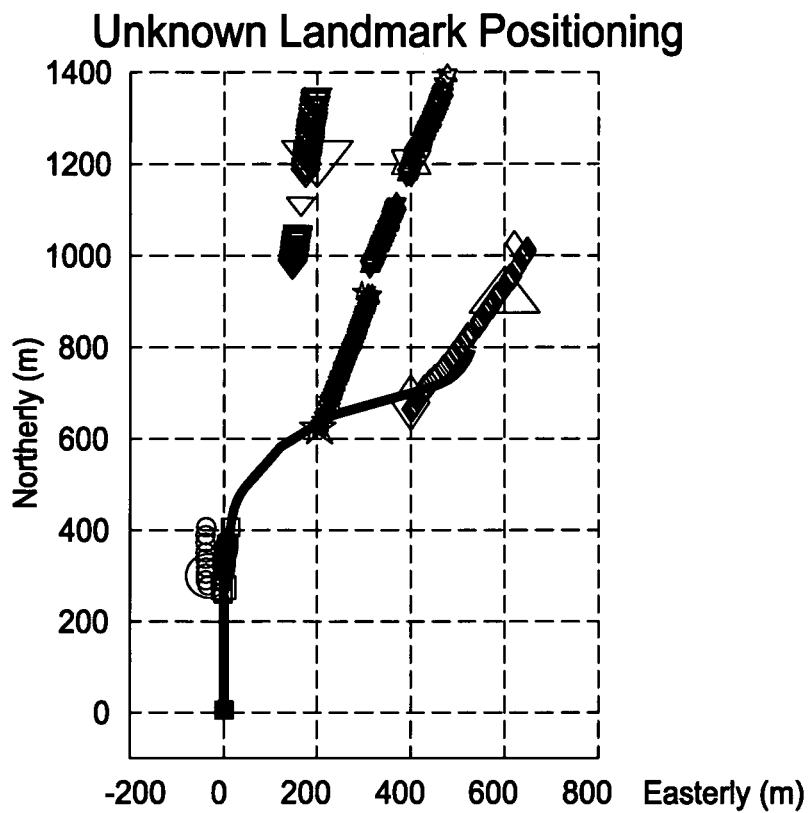
FIG. 11 is a graph showing the estimates of unknown recognized landmarks while a known or previously estimated landmark is available.

Meanwhile, FIG. 11 shows that the Landmark Positioning process estimates the positions of unknown recognized landmarks during the travel shown in FIG. 10. FIG. 11 shows: the true coordinates of each landmark by large icons; and the estimated coordinates of each landmark by small icons. The true coordinates, estimated coordinates at the last moment that the triangle landmark goes out of FOV (Field of View), and the errors (True−Estimated) are summarized in the following chart:

| Icon | True E, N, −D (m) | Estimated E, N, −D (m) | ERR (m) |
|---|---|---|---|
| Circle | (−20, 300, 5) | (−19.3, 280.5, 5.0) | (0.7, 19.5, 0.0) |
| Square | (20, 300, 5) | (18.9, 279.4, 4.7) | (1.1, 30.6, 0.3) |
| Pentagram | (200, 620, 2) | (198.0, 604.0, 1.0) | (2.0, 16.0, 1.0) |
| Diamond | (400, 670, 2) | (395.6, 656.3, −0.8) | (4.4, 13.7, 2.8) |
| Hexagram | (400, 1200, 50) | (386.9, 1204.5, 44.2) | (13.1, −4.5, 5.8) |
| Downward triangle | (200, 1200, 50) | (180.6, 1196.5, 48.5) | (19.4, 3.5, 1.5) |

Figure 12:
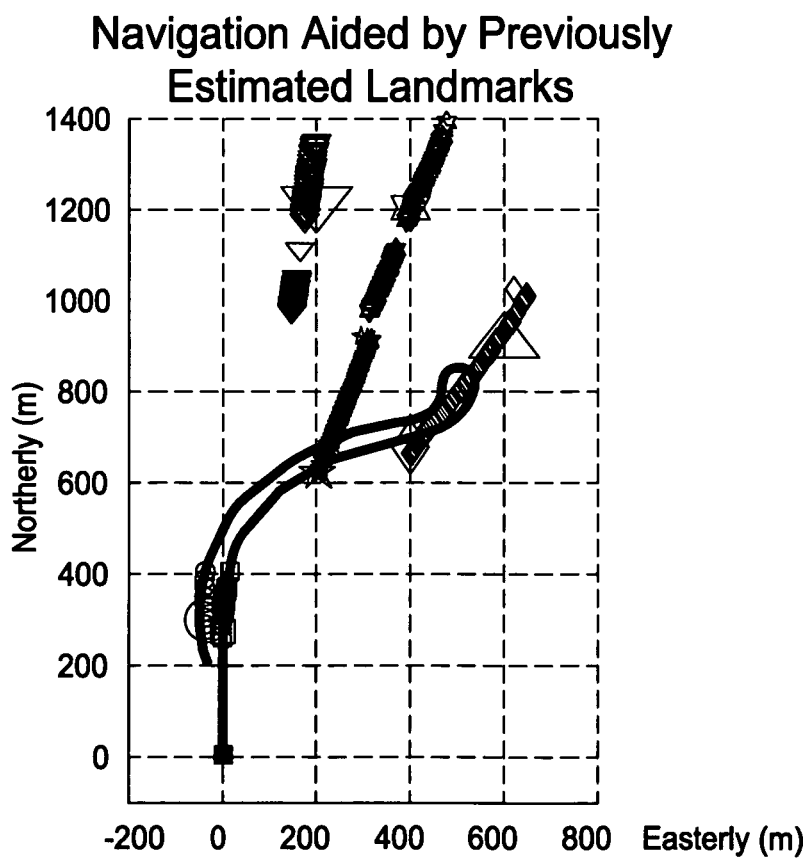
FIG. 12 is a graph showing the successful returning trip using the imagery measurements of unknown landmarks whose positions have been estimated during the first half trip in accordance with the present invention.

When the triangle landmark becomes unavailable at the half end of the trajectory, the present invention turns off the landmark positioning process, and start using the lastly estimated positions of the landmarks for the navigation aided by Imagery process. By doing so, it is possible to successfully and accurately come back as shown in FIG. 12 even though the originally known triangle landmark is no longer available in the returning trip and the estimated positions of landmarks are not perfectly precise. FIG. 12 shows the successful returning trip using the imagery measurements of unknown landmarks whose positions have been estimated during the first half trip.

Figure 13:
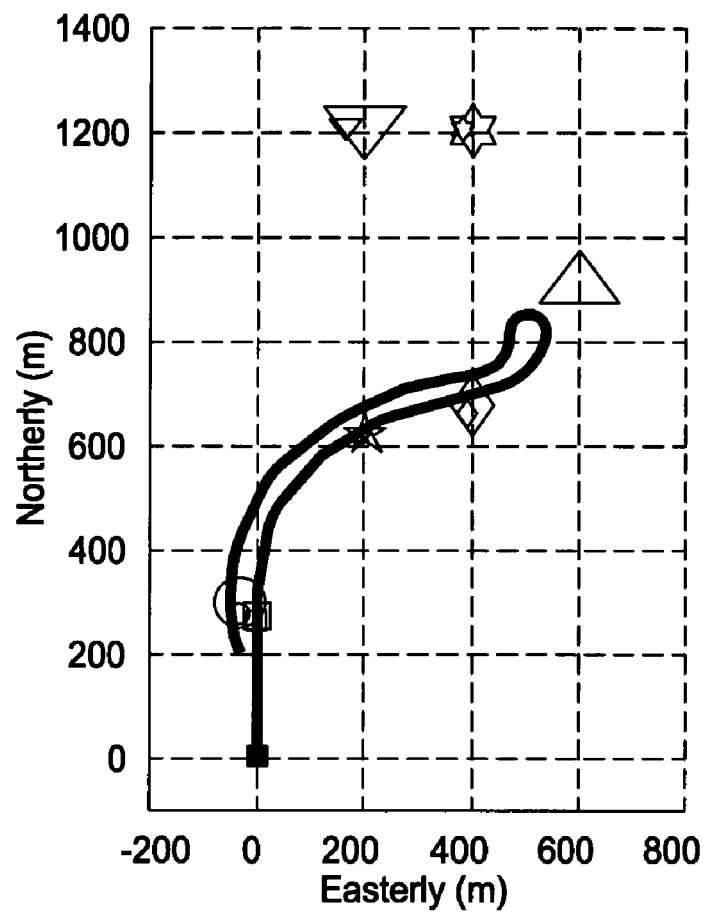
FIG. 13 is a graph showing the consequent landmark position database in addition to the estimated vehicle path in accordance with the present invention.

FIG. 13 shows the consequent of estimated vehicle path and the estimated landmark positions. Again, the position of triangle landmark has been known from the beginning. For other landmarks, the true positions are represented by large icons, and their final position estimates are shown by small icons.

The landmark database can be re-calibrated by revising and re-capturing the images by starting with the lastly estimated position registered in the landmark database as the initial condition and changing the choice of the "known" landmarks to be used as augmented measurements for navigation aided by imagery.

In this simulation, the following specifications are assumed for the CCD camera:

Pixel Number: 1024×984 Pixel Size: $5\times10^{-6}$ m

Focal Length: $2.745\times10^{-3}$ m Field of View (FOV): 50 degrees

Figure 14:
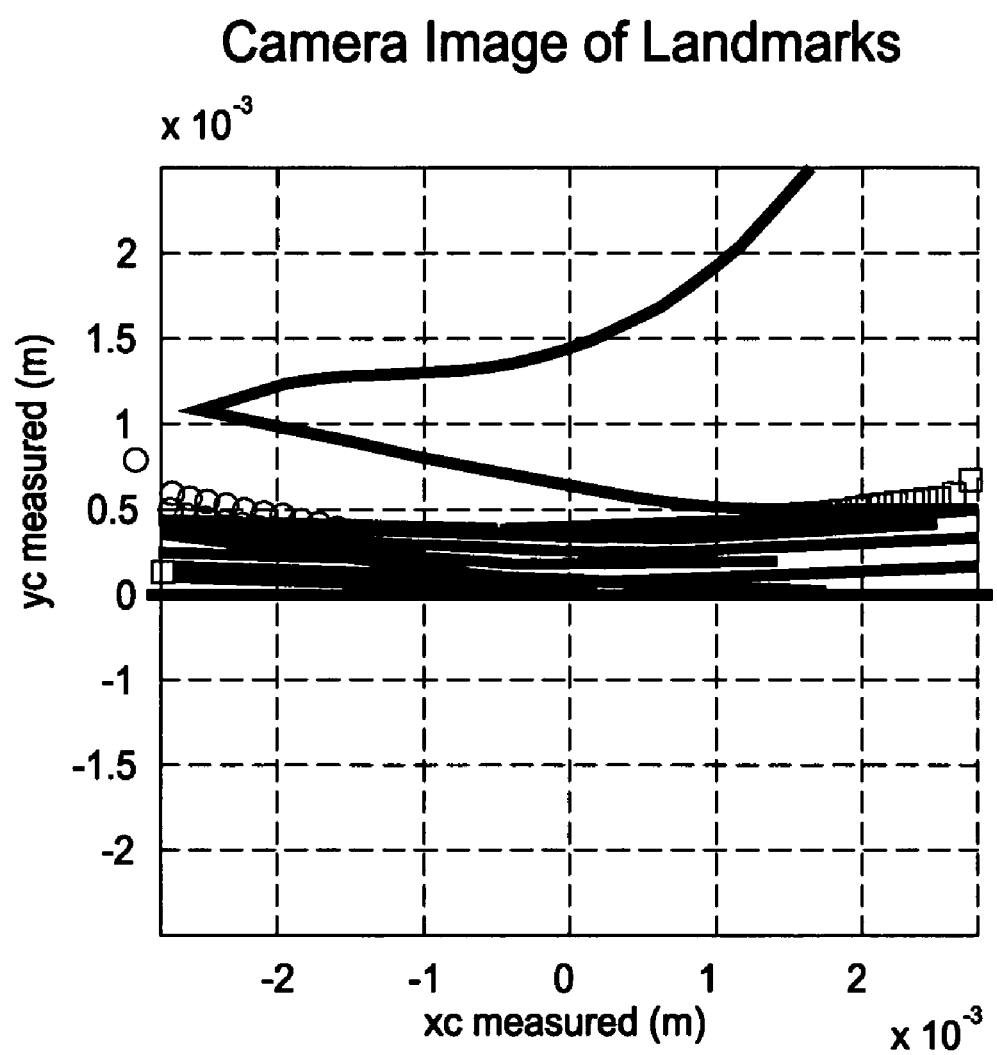
FIG. 14 is a graph showing the camera image over the entire simulation period showing apparent paths of landmarks in a camera frame.

The pixel coordinates of real numbers obtained by the line of sight passing through the image frame are discretized according to the pixel size to give out Xc and yc. The apparent flow of each landmark is shown in FIG. 14 with the corresponding icon.

Figure 15:
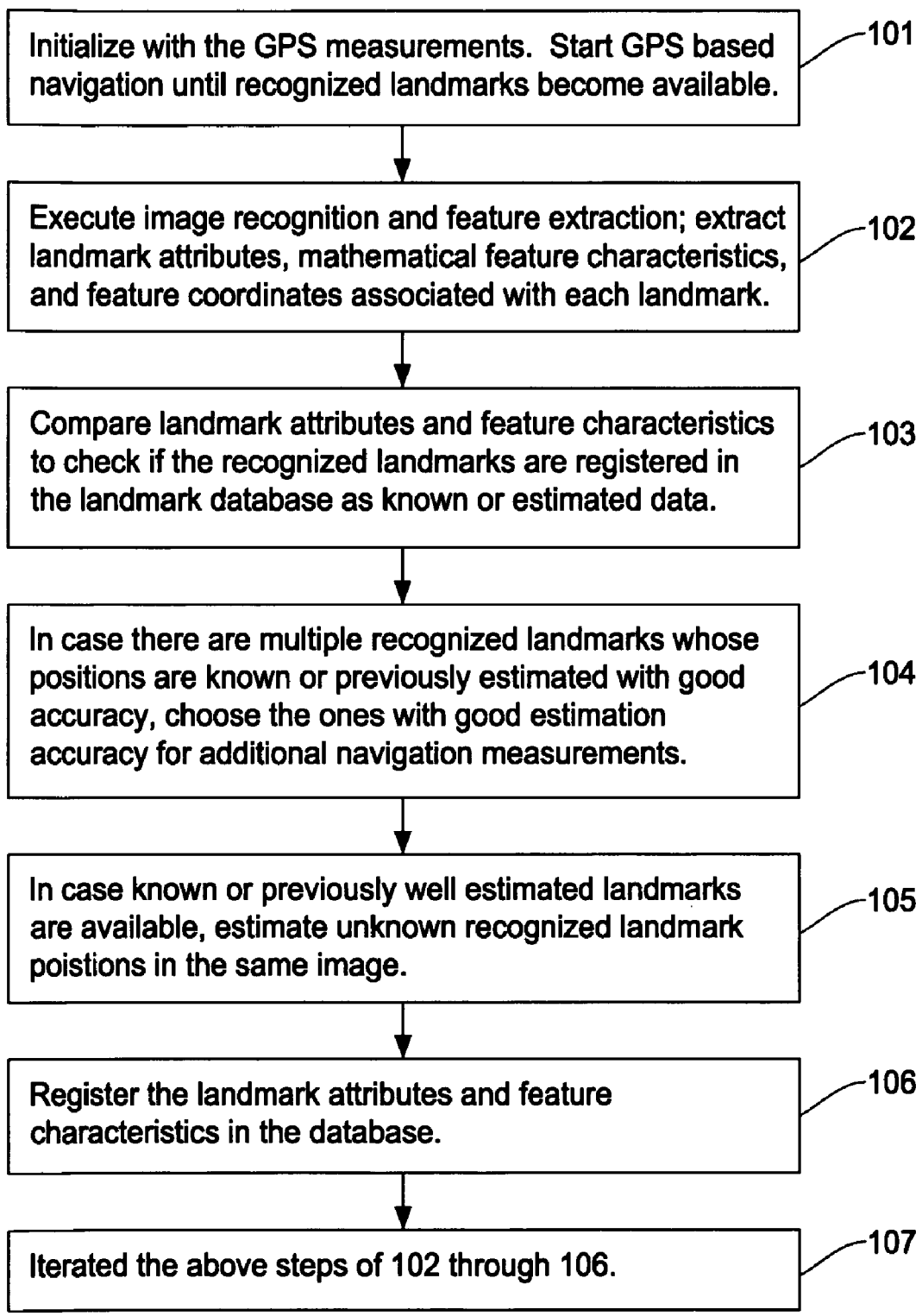
FIG. 15 is a flowchart showing an example of basic operational process for the integrated imagery/navigation system of the present invention to enhance the navigation accuracy and to create the landmark database simultaneously.

FIG. 15 is a flowchart summarizing the overall procedure of the present invention involved in the integrated imagery/navigation system to enhance the navigation accuracy and to create the landmark database simultaneously. In the step 101, the integrated imagery/navigation system initializes the GPS measurements and starts the GPS based navigation until recognized landmarks become available. In the step 102, the integrated imagery/navigation system executes the image recognition and feature extraction by extracting the landmark attributes, mathematical feature characteristics, and feature coordinates associated with each landmark. In the step 103, the integrated imagery/navigation system compares the landmark attributes and feature characteristics to check if the recognized landmarks are registered in the landmark database as known or estimated data. Namely, the landmark data in the landmark database 60 (FIGS. 2A and 2B) is retrieved and compared with the newly acquired landmark data.

In case there are multiple recognized landmarks whose positions are known or previously estimated with good accuracy, in the step 104, the integrated imagery/navigation system chooses the ones with good estimation accuracy for additional navigation measurements. In other words, the process selects the landmark data of higher position accuracy for integrating with the GPS position estimates. In case known or previously well estimated landmarks are available, in the step 105, the integrated imagery/navigation system estimates unknown recognized landmark positions in the same image. In the step 106, the integrated imagery/navigation system registers the landmark attributes and feature characteristics in the database. In the step 107, the above steps of 102 through 106 are repeated until all of the landmarks are evaluated.

What is claimed is:

1. A method of estimating a platform position with high accuracy, comprising the following steps of:

receiving GPS signals from satellites and processing the GPS signals for producing position estimation information;

obtaining image data of landmarks surrounding the platform through a camera mounted on the platform;

conducting an image recognition process on the image data thereby extracting attributes and feature characteristics of the landmarks;

registering the attributes and feature characteristics of the landmarks in a landmark database thereby establishing and updating the landmark database; and incorporating the attributes and feature characteristics of the landmarks into the position estimation information produced from the GPS signals, thereby improving accuracy of the position estimate.

2. The method of estimating the platform position as defined in claim 1, further comprising a step of:

comparing the attributes and feature characteristics of the landmark with data stored in the landmark database to check if landmarks recognized through the camera are registered in the landmark database as known or estimated data.

3. The method of estimating the platform position as defined in claim 2, wherein said step of comparing the attributes and feature characteristics of the landmark with data stored in the landmark database includes a step of re-identifying the recognized landmarks in the landmark database correlating the landmark attributes obtained by image recognition and mathematical feature characteristics obtained by feature extraction with the corresponding data in the landmark database.

4. The method of estimating the platform position as defined in claim 3, wherein said landmark attributes include position, type, color, facing streets, etc. of the landmark, and said mathematical feature characteristics include edge curvature gradient of the landmark.

5. The method of estimating the platform position as defined in claim 2, wherein said step of comparing the attributes and feature characteristics of the landmark with data stored in the landmark database includes a step of selecting known or estimated data of the landmarks with higher estimation accuracy than that of the other for incorporating the selected data into the position estimation information produced from the GPS signals.

6. The method of estimating the platform position as defined in claim 1, wherein said attributes and feature characteristics of the landmark extracted via the image recognition process represent the landmark by one or more representative features inside the recognized landmark.

7. The method of estimating the platform position as defined in claim 1, wherein said step of incorporating the attributes and feature characteristics of the landmarks into the position estimation information produced from the GPS signals includes a step of executing a Kalman filter process with additional imagery measurements of landmarks whose positions are known or previously estimated, thereby enhancing the accuracy of the position estimate.

8. The method of estimating the platform position as defined in claim 1, wherein a plurality of different frequencies are used for conducting the steps: a high frequency to update the position estimates in a dead reckoning condition; a middle frequency to correct the position estimates based upon the image data obtained through the camera, and a low frequency to correct the position estimates based upon the GPS signals.

9. The method of estimating the platform position as defined in claim 1, wherein said landmark database is updated in real-time by registering the landmark attributes including position, type, color, facing streets, etc. of the landmark, and the feature characteristics including edge curvature gradient of the landmark.

10. The method of estimating the platform position as defined in claim 1, wherein said step of registering the attributes and feature characteristics of the landmarks in the landmark database includes a step of re-calibrating the landmark database by starting landmark position estimation with lastly estimated position registered in the landmark database as an initial condition as well as changing a choice of known landmarks to be used for navigation accuracy enhancement.

11. An integrated imagery/navigation system for estimating a platform position, comprising:
- a GPS receiver for GPS measurements by receiving GPS signals from satellites and processing the GPS signals for producing position estimation information;
- a camera for imagery measurements by retrieving image data of landmarks surrounding the platform;
- means for conducting an image recognition process on the image data thereby extracting attributes and feature characteristics of the landmarks; and
- a Kalman filter for conducting a Kalman filtering procedure on the position estimation information from the GPS receiver and the image data retrieved by the camera, thereby improving accuracy of the position estimate.

12. The integrated imagery/navigation system for estimating the platform position as defined in claim 11, further comprising a landmark database for storing and updating the attributes and feature characteristics of the landmarks.

13. The integrated imagery/navigation system for estimating the platform position as defined in claim 12, wherein the attributes and feature characteristics of the landmark extracted from the image data retrieved by the camera are compared with he attributes and feature characteristics of the landmark stored in the landmark database to check if the landmarks recognized through the camera are registered in the landmark database as known or estimated data.

14. The integrated imagery/navigation system for estimating the platform position as defined in claim 13, wherein said attributes and feature characteristics of the recognized landmarks in the landmark database correlating the landmark attributes obtained by image recognition and mathematical feature characteristics obtained by feature extraction are re-identified with the corresponding data in the landmark database.

15. The integrated imagery/navigation system for estimating the platform position as defined in claim 14, wherein said landmark attributes include position, type, color, facing streets, etc. of the landmark, and said mathematical feature characteristics include edge curvature gradient of the landmark.

16. The integrated imagery/navigation system for estimating the platform position as defined in claim 12, wherein said attributes and feature characteristics of the landmark are compared with the attributes and feature characteristics of the landmark stored in the landmark database and the known or estimated data of the landmarks with higher estimation accuracy than that of the other is selected for incorporating the selected data into the position estimation information produced from the GPS signals.

17. The integrated imagery/navigation system for estimating the platform position as defined in claim 11, wherein a plurality of different frequencies are used for conducting the position estimates: a high frequency to update the position estimates in a dead reckoning condition; a middle frequency to correct the position estimates based upon the image data obtained through the camera, and a low frequency to correct the position estimates based upon the GPS signals.

18. The integrated imagery/navigation system for estimating the platform position as defined in claim 12, wherein said landmark database is updated in real-time by registering the landmark attributes including position, type, color, facing streets, etc. of the landmark, and the feature characteristics including edge curvature gradient of the landmark.

19. The integrated imagery/navigation system for estimating the platform position as defined in claim 12, wherein said landmark database is re-calibrated by starting landmark position estimation with lastly estimated position registered in the landmark database as an initial condition as well as changing a choice of known landmarks to be used for navigation accuracy enhancement.

20. The integrated imagery/navigation system for estimating the platform position as defined in claim 11, further comprising a GUI (graphic user interface) for processing the outputs of the Kalman filter and displaying the estimated position of the platform as a man-machine interface.

* * * * *